United States Patent [19]

Kamens et al.

[11] 4,101,464
[45] * Jul. 18, 1978

[54] PROCESS FOR PREPARING FOAMED SOLIDS USING TWO OR MORE AZO COMPOUNDS

[75] Inventors: Ernest Rudolph Kamens, Tonawanda, N.Y.; Donald Milton Kressin, Glen Burnie, Md.; Harold Carl Lange, Grand Island; Ronald Edward MacLeay, Williamsville, both of N.Y.

[73] Assignee: Pennwalt Corporation, Phialdelphia, Pa.

[*] Notice: The portion of the term of this patent subsequent to Nov. 23, 1993, has been disclaimed.

[21] Appl. No.: 723,679

[22] Filed: Sep. 16, 1976

Related U.S. Application Data

[63] Continuation-in-part of Ser. No. 548,946, Feb. 11, 1975, Pat. No. 3,993,609, which is a continuation-in-part of Ser. No. 453,446, Mar. 21, 1974, abandoned.

[51] Int. Cl.² .............................................. C08J 9/02
[52] U.S. Cl. ..................................... 521/88; 521/118; 521/128; 521/138; 521/95; 521/115; 521/89; 521/90; 521/121; 521/135; 521/162
[58] Field of Search .............. 260/2.5 R, 2.5 S, 2.5 N, 260/2.5 BD, 2.5 D, 2.5 F, 2.5 EP, 2.5 P, 2.5 H

[56] References Cited

U.S. PATENT DOCUMENTS

| 2,576,073 | 11/1951 | Kropa et al. | 260/2.5 N |
| 3,260,688 | 7/1966 | Watanabe et al. | 260/2.5 N |
| 3,677,981 | 7/1972 | Wada et al. | 260/2.5 S |
| 3,993,609 | 11/1976 | Kamens et al. | 260/2.5 R |

Primary Examiner—Thomas De Benedictis, Sr.

[57] ABSTRACT

Cellular polymeric solids are made by mixing an acidulous or acidic polymerizable medium that is polymerizable and/or cross-linkable by a free radical mechanism (e.g. an unsaturated polyester) with an effective amount of two or more acid sensitive mono- or poly-azo compounds containing the group:

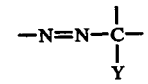

wherein Y is an acid sensitive group (e.g. Cl, OH, —OCN, —NCO) which in the presence of an acidulous or acidic polymerizable medium causes sufficient decompsition of the azo compound that gas is released in the medium and during the decomposition the mono- or poly- azo compound promotes polymerization and/or cross-linking of the medium to provide a matrix that is sufficiently polymerized and/or cross-linked that the generated gases cause the matrix to expand, each of the remaining valences being satisfied by an organic radical; provided that any carbon atom that is directly linked to an azo nitrogen, except that of a carbonyl group, has at least two of its remaining three valences satisfied by a carbon to carbon bond or a carbon to hydrogen bond. Preferably, the mixture contains at least two such azo compounds having appreciably different sensitivity to decomposition by acid. The process is especially useful in making foamed flotation structures (e.g. boat hulls).

23 Claims, No Drawings

PROCESS FOR PREPARING FOAMED SOLIDS USING TWO OR MORE AZO COMPOUNDS

Cross-Reference to Related Applications

This application is a continuation-in-part of U.S. Pat. No. 548,946, filed Feb. 11, 1975, now U.S. Pat. No. 3,993,609, which is a continuation-in-part of Ser. No. 453,446, filed Mar. 21, 1974 and now abandoned. The entire disclosure of both of said applications is hereby incorporated herein by reference.

In application Ser. No. 453,446, we disclosed (e.g. see Table V, Examples V-100, V101 and V102 and and Table VI, Examples VI-20, VI-21, V1-41, V1-42 and V1-43) that mixtures of two or more acid sensitive azo compounds could be used to both foam and cure a polymerizable and/or cross-linkable medium. This disclosure was repeated in Ser. No. 548,946 (see Examples 5-100, 5-101, 5-102, 6-20, 6-21, 6-41, 6-42, and 6-43). Ser. No. 453,446 (Example 4) and S.N. 548,946 also disclosed (Example 19) such use of a mixture of two acid sensitive azo compounds having appreciably different sensitivities of rates of decomposition by acid to gases. This mixture comprises about 75% 2-t-butylperoxypropane and 25% 2-t-butylazo-2-hydroxypropane.

The Prior Art

Kropa et al, U.S. Pat. No. 2,576,073 issued Nov. 20, 1951 discloses the foaming and curing of an unsaturated alkyd resin by using a combination of a blowing agent and a curing agent. In contrast, the azo compounds defined in the present invention have the ability, when reached with acid, to cause both foaming and polymerization of cross-linking. The Kropa et al. technique requires external heating to cause foaming; whereas the present invention can be practiced without use of external heat, since both the foaming and curing are caused by acid decomposition of the azo compound. Wada et al, U.S. Pat. No. 3,677,981, issued July 18, 1972, disclose the use of at least one compound which functions as a blowing agent and another platinum-containing compound which functions as a polymerization catalyst. A polymerization catalyst and a free-radical initiator differ in that the catalyst is not destroyed in the reaction; whereas a free radical initiator is consumed in the initiation reaction. The chemistry of the reactions and polymers produced by these two types of agents are significantly different and the agents are not generally considered equivalents in the polymerization art. Wada et al, also discloses that heat is required to decompose their blowing agents.

Watanbe et al., U.S. Pat. No. 3,260,688, issued July 12, 1966 teach how to produce uncured foams from an unsaturated polyester and must use a subsequent curing step to obtain an acceptable product.

Doyle, U.S. Pat. No. 3,823,099, issued July 9, 1974, uses a combination of a blowing agent and a free radical polymerization initiator to prepare solid foams from an unsaturated polyester by reaching in situ a small amount of a polyisocyanato blowing compound with a hydrogen donor (e.g., water) to form a blowing agent. The blowing reaction must be exothermic to accellerate the curing by decomposing the free-radical curing agent.

None of the above-cited patents discloses a process for making cellular polymeric solids by mixing an acidulous or acidic polymerizable medium with an effective amount, for foaming and curing, of an acid-sensitive azo compound which can both cure and cause foaming, let alone show any reason for using a mixture of two or more such azo compounds.

Summary of the Invention

A process for preparing cellular polymeric structures comprises mixing an acidulous or acidic polymerizable medium that is polymerizable and/or cross-linkable by a free radical mechanism with an effective amount of two or more acid sensitive mono- or poly-azo compounds containing the group:

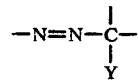

(sometimes hereinafter called "FORMULA I") wherein Y is an acid sensitive group which in the presence of an acidulous or acidic polymerizable medium causes sufficient decomposition of the azo compound that gas is released in said medium and during said decomposition said mono- or poly-azo compound promotes polymerization and/or cross-linking of said medium to provide a matrix that is sufficiently polymerized and/or cross-linked that the generated gases cause the matrix to expand, each of the remaining valences being satisfied by an organic radical; provided that any carbon atom that is directly linked to an azo nitrogen, except that of a carbonyl group, has at least two of its remaining three valences satisfied by a carbon to carbon bond or a carbon to hydrogen bond. The azo compound can be added as mixtures, or individually at the same time or at different times during the course of the foaming and curing reactions.

Among the operable combinations of acid sensitive azo compounds are the following:
 mixtures of phenyl, mono-, di- and trichlorophenyl alpha-Y substituted azo alkanes;
 2-t-butylazo-2-(t-butylperoxy)propane and 2-t-butylazo-2-hydroxypropane;
 1-t-butylazo-1-hydroxy cyclohexane (available commercially as "LUCEL 6") and 2-t-butylazo-2-hydroxy butane (available commercially as "LUCEL 4");
 1-t-butylazo-1-acetoxycyclohexane and 2-t-butylazo-2-methoxypropane; and
 2-t-butylazo-2-(t-butylperoxy) propane and 2-t-butylazo-2-hydroperoxy-4-methylpentane.

The invention includes shaped cellular structures formed from media which are polymerizable and/or cross-linkable by free radical initiation to either a thermoplastic or thermosetting solid, processes for production of such structures and the compositions therefor, including certain mixtures of two or more acid sensitive azo compounds. The process includes preparation of compositions by mixing two or more acid sensitive azo compounds with an acidulous or acidic polymerizable medium, after or during which mixing the composition is permitted to foam and cure into a solid cellular structure of the desired shape.

The process further comprises preparing the composition by mixing the acid sensitive azo compounds with the acidulous or acidic polymerizable medium at a temperature below that at which during the mixing cycle, neither substantial thermal decomposition of the azo compound nor substantial cross-linking or further polymerization of the medium normally occurs; after mixing the composition is permitted to foam into a resinous cellular structure of the desired shape (as used herein, being "permitted to foam" denotes decomposition of a portion of the azo compound to effect liberation of gas and simultaneous use of another portion of the azo compound and/or further polymerizarion of the resulting resin).

Further Description

Advantages Over the Prior Art

This invention, while of a broad nature, is of particular interest in connection with the foaming of unsaturated polyesters. There are several references in the literature to methods proposed for foaming polyester resins, but to a large extent the proposed literature methods were carried out using complex mixtures of components in aqueous systems. Moreover, many of them relate to a sequential operation in which one first releases gas to the polymerizable/cross-linkable resin medium following which one attempts to effect polymerization/cross-linking without destroying the foam. The difficulties involved in such a technique are manifest. One must attempt to correlate the foaming operation and the further polymerization/cross-linking operation. Such operations have been found to be entirely impracticable. It has also been attempted in the prior art to produce foams by initiating polymerization/cross-linking while gas is being released to the resinous medium. This too has proved to be entirely impracticable. Where one attempts to perform such prior art operations in such a manner that the release of gas and the initiation of polymerization/cross-linking is substantially simultaneous, the polymerization/cross-linking reaction takes place so quickly that the resin medium becomes too highly viscous or even rigid at such an early stage that the resin cannot be foamed. In the case where the operation is performed sequentially, the foam is a transitory nature; i.e. the foam dissipates, to the extent that the gas is released to the atmosphere, before polymerization/cross-linking is effected.

While the well-known azo blowing agents, such as azodicarbonamide, decompose into gaseous products upon heating, they do not act concurrently as a polymerization initiator, and the incorporation of a separate initiator is required to support the foam. Addition of a separate gelling agent presents the problem of coordinating the polymerization of the resin with the release of the gas from the blowing agent. Furthermore, azodicarbonamide as a blowing agent requires too high a temperature for use with polyesters. In the case of normal azo initiators, such as azo nitriles, the curing of the polyester system develops so rapidly that the gas released does not have any opportunity to expand.

In the process of the present invention, the azo compounds react with the resin media in a fortuitously coordinated manner to both release gaseous products and initiate polymerization and/or cross-linking of the resin media. Thus, the azo compounds are activated by an aciduous or acidic polymerizable medium (as defined hereinafter) to gel the resulting resin while the gas is liberated. In view of the coordinated reactions, the resin medium expands while resin gelling occurs, forming a cell structure.

The present invention while not limited thereto, is especially useful in the preparation of foamed polyester resins, both rigid and flexible. Cellular structures formed from polyesters are relatively strong and inexpensive, generally resistant to heat and chemicals and exhibit good light stability and minimal moisture pickup. Cellular polyester structures are not commercially available due to the difficulty discussed above, i.e. coordination of gas generation and resin solidification. The present invention presents a simple and effective answer to that problem.

SPECIAL UTILITY OF THE PRODUCT

Densities of about 25 lb. per cubic foot in the final cellular structure generally render the structures useful as synthetic wood in applications such as picture frames or plaques while densities of about 35 lb. per cubic foot are appropriate for molded components for structural purposes, such as furniture parts for which wood is normally used. Insulation, flotation articles, packaging and energy absorption materials, may have densities of about 2 lb. per cubic foot. Closed cell structures would be utilized where water resistance is desired while open cell configurations would be adopted for use as sponges, for example.

Definitions

By "acid sensitive azo compounds" as broadly used in the instant invention is meant those mono- and poly- azo compounds containing the group

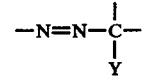

or "FORMULA I")
wheren Y is a monovalent or divalent acid sensitive group which in the presence of an acidulous or acidic polymerizable medium causes sufficient decomposition of the azo compound to release gas in the medium while said mono- or poly- azo compounds also promote polymerization and/or cross-linking of the medium to provide a matrix that is sufficiently polymerized and/or cross-linked that the generated gases cause the matrix to expand (this state of polymerization and/or cross-linking is commonly known, and is referred to hereinafter, as the "gelled " state), the remaining valences in FORMULA I being satisfied by organic radicals; provided that any carbon atom that is directly linked to an azo nitrogen (except that of a carbonyl group) has at least two of its remaining three valences satisfied by a carbon to carbon bond or a carbon to hydrogen bond.

Particular acid sensitive groups (Y) include halogens, groups having an oxygen or sulfur atom linked to the carbon atom shown in FORMULA I (such as hydroxyl, hydroperoxy, alkyl peroxy, ester, ether, cyanate, thiocyanate, sulfonyl groups), and groups linked to the carbon atom shown in FORMULA I by a nitrogen atom (such as urea derivatives, hydrocarbyl-oxa(or thia)- amides (or thio-amides), amines, isocyanates, and isothiocyanates).

By the term "polymerizable medium" is meant the fluid phase with which the acid sensitive azo compound is mixed. It is essential that one component in this medium by polymerizable or cross-linkable by free radical initiation, i.e. the component is a resin polymerizable or cross-linkable by free radical initiation ("reactive resin") or is a vinyl or vinylidene monomer. Thus the medium may be conveniently classified as any of the following Medium Systems Types A, B, C, D or E (exemplified in greater detail hereinafter and in patent Ser. No. 548,946):

Medium A: A reactive polymeric resin, or mixture of reactive resins, or a mixture of a reactive polymeric resin (or resins) with an unreactive resin or resins.

Medium B: Reactive resin(s) and/or unreactive resin(s) dissolved and/or dispersed in a polymerizable monomer or mixture of monomers.

Medium C: A reactive resin or mixture of resins at least one being reactive dissolved or dispersed in an inert solvent or diluent.

Medium D: A monomer or mixture of monomers.

Medium E: Combinations of any or all of the above. Many of the physical properties of the resultant foams will depend on the nature of the polymerizable medium in a manner well understood by those skilled in the art. Also, the number and spacing of cross-linkable functions in the resin will affect the degree of rigidity or flexibility of the cured foamed product as is well known to those skilled in the art. A wide variety of inert liquid diluents may be added to any of the above described polymerizable media to give appropriate viscosity, physical properties and/or cost.

By the term "acidulous" polymerization medium is meant that the polymerization medium without added extraneous acid, contains a detectable acid number. As will be discussed in greater detail hereinafter, some azo compounds are sufficiently acid sensitive that the resin media needs only to be acidulous to provide azo activation. Resins containing free-acid end groups, such as polyesters, will frequently suffice without the need to supply extraneous acid. For example, the alpha-hydroxyazo compounds hereof wherein Y is OH and $R^7$ is not H (of FORMULA II, hereinafter) are sensitive enough that the acidity of the polyester resin alone, with no extraneously added acid, is sufficient to activate their decomposition.

By the term "acidic" polymerization medium is meant a medium to which extraneous acid has been added to promote azo decomposition. When addition of extraneous acid becomes necessary because of the nature of the resin media or the azo compound, a wide range of acids may be employed. In general, for the more highly acid sensitive azo compounds relatively weak acids are suitable whereas for the less acid sensitive azo compounds strong acids are often necessary.

By the term "activator" as used herein is meant a compound which may be added to the polymerizable medium to effect activation of acid sensitive compounds so as to permit foaming of the polymerizable medium. Both organic and inorganic Bronsted-Lowry acids (substances which will dissociate a proton) and acylalkylsulfonyl peroxides have been found useful for this purpose. An activator can be used to form an "acid" polymerization medium or to increase the decomposition of the azo compound during foaming of any polymerizable medium. Among the acylalkyl sulfonyl peroxides, particularly effective are acylalkyl (cycloalkyl-)sulfonyl peroxides having the general structure:

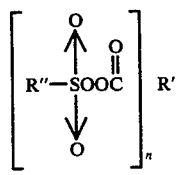

where $n = 1$ or 2, R' is lower alkyl of 1 to 6 carbons, or (where $n = 2$) lower alkylene of 1 to 6 carbons, R'' is secondary and tertiary alkyl of 4 to 20 carbons and cycloalkyl (including bicycloalkyl) of 5 to 10 carbons which can be optionally substituted by inert substituents such as chlorine, cyano, lower acyloxy or lower alkoxycarbonyl.

By the term "differ appreciably in acid sensitivity" is meant that when the relative rates of decomposition by acid or acidulous medium of two azo compounds of Formula I are compared, the rates differ by at least about as much as the relative difference between the rate of such decomposition of 2-t-butylazo-2-hydroxy butane (LUCEL 4) and the rate of such decomposition of 1-t-butylazo-1-hydroxy cyclohexane (LUCEL 6).

Processing Conditions

The foregoing structural characterizations coupled with the concept of using any compound having such structure in an acidulous or acidic resin medium constitutes the critical aspects of the invention. So long as a monoazo or poly-azo compound have the structure as set forth hereinabove, and so long as that they are combined with an acidulous or acidic resin medium, one may successfully effect foaming of said resin. A wide range of processing conditions, shaping techniques and after-treatments may be used. In general, and broadly stated in the process of the present invention, the azo compounds are activated to decompose and generate gaseous products at room temperature or below upon contact with the polymerizable medium to provide foamed polymeric structures. The mixture of resin media and azo compound is shaped while the azo compound reacts with the resin medium (a) to blow it by gas generation and (b) to initiate polymerization of at least one component of the medium to provide a partially polymerized or partially cross-linked matrix, i.e. a matrix having fluidity characteristics such that the gases generated cause the matrix to expand, thereby to define a stable foam. The gas bubbles, dispersed through the gelled matrix, produce either a "closed" or "open" cellular configuration depending upon the amount and rate of evolution of the gas and the fluidity and strength characteristics of the resin medium during the period of gas generation. After shaping, the cellular structure can be cured. Depending upon the nature of the polymerizable medium involved, such curing can involve cross-linking and/or further polymerization. The use of an added curing agent (i.e. in addition to the acid-sensitive azo foaming agent) is optional; in some formulations it will improve the physical properties of the foamed structures.

Thus in the process of the present invention, the physical environmental conditions of temperature and pressure, the manipulative techniques and equipment employed in mixing components and the shaping of the cellular structure during or after its production as well as after-treating by curing, and the like, may vary widely. Some such variables are discussed in greater detail below for illustrative purposes.

Amount of Azo To Use

The amount of acid sensitive azo compound to be added to a particular resin medium will depend upon the effect desired, the chemical identity of each of the azo, the resin, and the extraneous acid or other activator (if used) and the temperature at which the components are mixed. Obviously, a lesser amount of a particular azo compound will produce, in an otherwise identical system under the same conditions, a higher density product than a relatively larger amount. Whether the cells will be closed or open will depend both on the amount of azo used, the strength characteristics of the resin during the expansion process, and the like. These are variables within the skill of technicians versed in the art of blowing plastics. Usually the use of sufficient azo to provide from 0.5 to 4 weight percent based on total reactant is sufficient to form closed cell structures. As little as 0.2 weight percentage will often produce observable foaming. As much as 15 weight percentage of azo has been found useful in some systems. Generally, from about 0.2 to 8 weight percentage of azo may be used effectively.

Mixing Techniques

Any conventional mixing method can be used to distribute the azo compound throughout the resin medium, and any high speed paddle mixer is suitable. Mixing nozzles for combining the two liquids may also be employed. The order of addition of the reactants is not critical and may be varied for particular purposes. However, it is usually preferable that the resin medium contains whatever acid is necessary and whatever curing agent is desired prior to the incorporation of the azo compound. The azo compound can be mixed with monomer such as styrene and the latter mixture added to the acidulated resin to facilitate processing.

Temperature Variation

The temperature at which the azo compound is mixed with the resin medium is usually not important provided it is low enough to avoid rapid premature polymerization of the resin medium. Operative temperatures depend upon the nature of the azo compound and the resin. In general, the mixing should be performed at a temperature not exceeding that which would be normally used when the azo compound is employed for polymerization without an activator. Generally, the reaction will occur at room temperatures, and the speed of reaction at such temperatures will usually be suitable. The use of lower or higher temperatures may be preferred.

Optional Additive to Medium

The density of the foamed product structure can be controlled by the amount and identity of azo compound employed as pointed out previously. In addition, the amount of foaming and hence the density of the final cellular structure, can be augmented by the use of gases or liquids in the resin medium which have boiling points such that the liquids vaporize during either blowing or cure reactions. Liquids or gases of this class generally exhibit significant vapor pressure below the curing temperatures.

At times, it is advantageous to increase the flowability of the polymerizable medium by addition of an unreactive diluent or solvent. It has also been found useful to add surfactants to the resin medium to promote uniformity of cell size in the final product. Such additives are particularly valuable in systems employing a relatively high concentration of azo compound to initiate polymerization and blow the medium. Such surfactants may be of the cationic (quarternary salts), anionic (sulfonates and sulfates) and nonionic (ethylene oxide condensates) type. Some suitable surfactants include such materials as: metallic soaps, alkylene oxide-phenol addition products, alkyl aryl sulfates and sulfonates, dimethyl siloxane polymers, and cationic siloxanes of the general formula shown in U.S. Pat. No. 3,642,670. Air will also serve as a nucleating agent. Only a small amount, well dispersed as small bubbles throughout the resin, is needed (as distinguished from the case where one attempts to foam the resin by beating air into it). It is sufficient to mix the resin medium with the acid sensitive azo compound hereof (and other components hereof as desired) in the presence of air. In the experiments hereof carried out in paper cups and the like, this was accomplished simply by mixing with an electric stirrer. When one uses molding equipment involving pumped stream(s) and a mixing head, one simply bleeds some air to the mixing head.

Hollow ceramic, glass or graphite spheres can be added to the resin medium in order to decrease further the density of the final formed structure. These materials have densities less than that of the polymerized matrix and can be utilized to impart desired density or decorative properties to the foam.

Molding Techniques

Any means can be used to shape or mold the cellular structure that is produced during foaming of the resin. The mold system can be quiescent or dynamic, i.e., the initial reactants may be mixed in a mold in suitable proportions and permitted to react until the mold is filled or alternatively, the mixed reactants can be charged into a mold immediately after mixing, and before substantial gas generation or polymerization. In other systems the reactants can be mixed and extruded in various forms, such as sheets, rods, beads, sprays or droplets. Typical molds used in the furniture industry (room temperature vulcanizable silicone, polyurethane, and epoxy) are quite acceptable. The resultant foam piece accurately reproduces surface detail present on the mold. Sheet of the foamed product may also be formed simply by pouring the mixed reactants upon a flat surface or calendering the mixed reactants during or prior to reaction.

Curing The Shaped Structure

A curing agent, for example a non-acid sensitive azo compound or a peroxide used as a component of the polymerizable medium can substantially increase the strength of the foamed structure. The exotherm generated during the gelling step is often sufficient to activate the curing agent. However, where the curing agent has a half-life that is sufficiently long, activation of the curing agent may require application of external heat after blowing and gelling are complete. Curing agents for use in the polymerizable medium hereof are well known in the art and include (1) diacyl or diaroyl peroxides or peresters, sometimes in combination with tertiary amine promoters, or (2) ketone peroxide or peresters sometimes in combination with cobalt salt activating agents. A typical curing system employs benzoyl peroxide or t-butyl peroxybenzoate, and a promoter or activator therefor, such as N, N-dimethylaniline or N, N-dimethyl-paratoluidine, although in most cases such a promoter or activator is not necessary.

SUITABLE AZO COMPOUNDS

As indicated hereinbefore, the identity of the mono and polyazo compounds useful in this invention are accurately described in FORMULA I.

The preparation of such azo compounds is well-known in the art or is disclosed in Ser. No. 548,976 (which has been incorporated herein by reference). Various suitable definitions for "Y" in Formula I follow:

When Y is monovalent, it may be halogen, such as Cl or Br; $R^{11}OO-$; $-OH$; the formula of "Y" as an

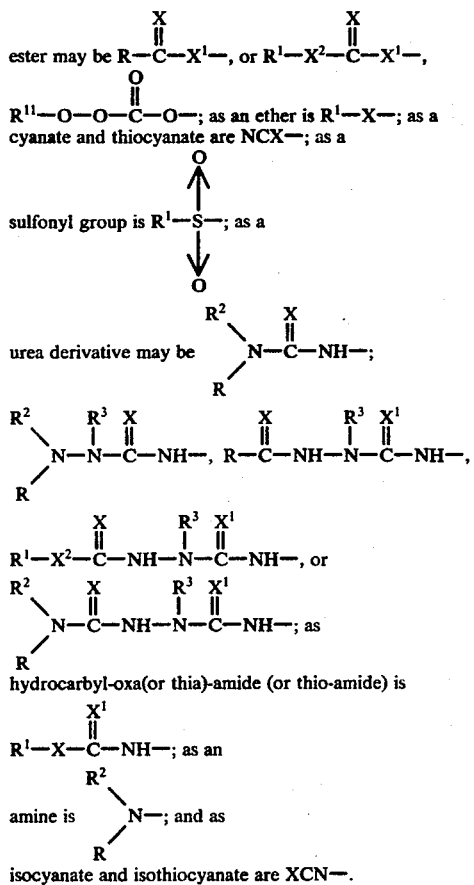

ester may be R—C(=X)—X¹—, or R¹—X²—C(=X)—X¹—, R¹¹—O—O—C(=O)—O—; as an ether is R¹—X—; as a cyanate and thiocyanate are NCX—; as a sulfonyl group is R¹—S(=O)(=O)—; as a urea derivative may be (R²)(R)N—C(=X)—NH—; (R²)(R)N—N(R³)—C(=X)—NH—, R—C(=X)—NH—N(R³)—C(=X¹)—NH—, R¹—X²—C(=X)—NH—N(R³)—C(=X¹)—NH—, or (R²)(R)N—C(=X)—NH—N(R³)—C(=X¹)—NH—; as hydrocarbyl-oxa(or thia)-amide (or thio-amide) is R¹—X—C(=X¹)—NH—; as an amine is (R²)(R)N—; and as isocyanate and isothiocyanate are XCN—.

When Y is a divalent radical, examples thereof include those wherein "Y" as an

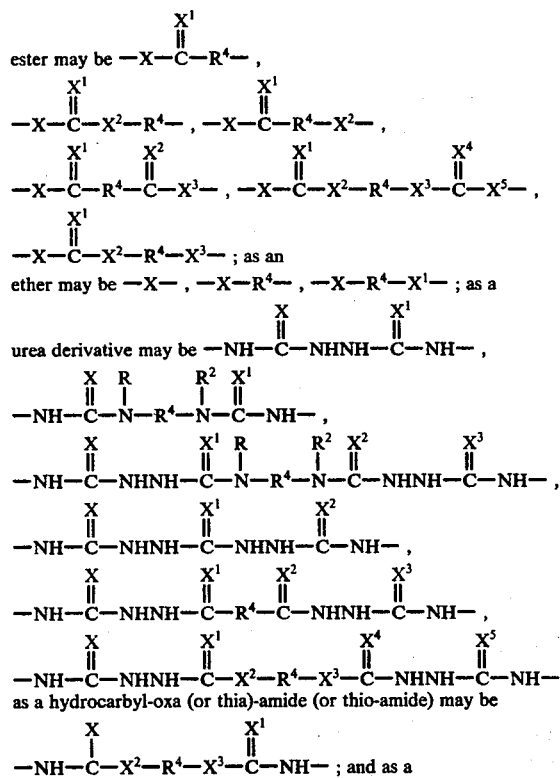

ester may be —X—C(=X¹)—R⁴—, —X—C(=X¹)—X²—R⁴—, —X—C(=X¹)—R⁴—X²—, —X—C(=X¹)—R⁴—C(=X²)—X³—, —X—C(=X¹)—X²—R⁴—X³—C(=X⁵)—X⁵—, —X—C(=X¹)—X²—R⁴—X³—; as an ether may be —X—, —X—R⁴—, —X—R⁴—X¹—; as a urea derivative may be —NH—C(=X)—NHNH—C(=X¹)—NH—, —NH—C(=X)—N(R)—R⁴—N(R²)—C(=X¹)—NH—, —NH—C(=X)—NHNH—C(=X¹)—N(R)—R⁴—N(R²)—C(=X²)—NHNH—C(=X³)—NH—, —NH—C(=X)—NHNH—C(=X¹)—NHNH—C(=X²)—NH—, —NH—C(=X)—NHNH—C(=X¹)—R⁴—C(=X²)—NHNH—C(=X³)—NH—, —NH—C(=X)—NHNH—C(=X¹)—X²—R⁴—X³—C(=X⁴)—NHNH—C(=X⁵)—NH—; as a hydrocarbyl-oxa (or thia)-amide (or thio-amide) may be —NH—C(=X)—X²—R⁴—X³—C(=X¹)—NH—; and as a

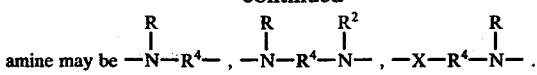

amine may be —N(R)—R⁴—, —N(R)—R⁴—N(R²)—, —X—R⁴—N(R)—.

In the foregoing, each of R, R² and R³ in the monovalent and divalent radicals "(Y)—" is the same or different substituent including H, a substituted or non-substituted hydrocarbon radical containing 1 to 18 carbon atoms, such as alkyl of 1 to 13 carbons; cycloalkyl of 3 to 12 carbons; aralkyl of 7 to 15 carbons; arcycloalkyl of 9 to 16 carbons; aryl of 6 to 14 carbons; alkaryl of 7 to 12 carbons; cycloalkaryl of 9 to 12 carbons; alkenyl of 2 to 17 carbons; cycloalkenyl of 5 to 12 carbons; 5 and 6 membered heterocyclic and benzheterocyclic wherein the hetero atoms are selected from oxygen, sulfur and nitrogen; and R and R² together may form an alkylene diradical of 2 to 11 carbons. Any substituent borne by R, R² or R³ is selected from lower alkoxy, aryloxy, hydroxy, alkoxycarbonyl, alkanoyloxy and aroyloxy, halogen, alkanoyl, aroyl, cyano, and carbamoyl. When Y is other than OH, R, R² and or R³ may also be substituted by carboxyl; the carbon atom content of the substituents borne by R, R² and R³ may vary between 1 and 18;

R¹ is a substituted or nonsubstituted hydrocarbon radical containing 1 to 18 carbon atoms such as alkyl of 1 to 12 carbons; cycloalkyl of 3 to 12 carbons; aralkyl of 7 to 15 carbons; arcycloalkyl of 9 to 16 carbons; aryl of 6 to 14 carbons, alkaryl of 7 to 12 carbons; and cycloalkaryl of 9 to 12 carbons; the substituents borne by R¹ is a group containing 1 to 18 carbon atoms selected from t-alkylperoxy-, t-aralkylperoxy, t-cycloalkylperoxy, t-alkylperoxycarbonyl, t-alkylperoxycarbonyloxy, alkanoylperoxy, alkanoylperoxy-carbonyl, α-hydroxyalkylperoxy-α-hydroxyalkyl, α-hydroperoxyalkylperoxy-α-hydroxyalkyl, alkanoylperoxycarbonyloxy, di-(t-alkylperoxy)-methylene, alkenyl, cycloalkenyl, alkynyl, cycloalkynyl, alkoxy, cycloalkoxy, aryloxy, alkaryloxy, cycloalkaryloxy, aroyloxy, alkaroyloxy, carbamoyloxy, alkanoyloxy, alkoxycarbonyloxy, cycloalkoxycarbonyloxy, alkaryloxycarbonyloxy, aryloxycarbonyloxy, alkoxycarbonyl, cycloalkoxycarbonyl, aryloxycarbonyl, alkaryloxycarbonyl, alkoxycarbonylamino, cycloalkoxycarbonylamino, aryloxycarbonylamino, alkaryloxycarbonylamino, alkanoyl, aroyl, alkaroyl, carbamoyl, acylamino, aroylamino, alkylamino, arylamino, thioalkanoyl, dithioalkanoyl, thioaroyl, dithioaroyl, alkylthio, arylthio and 5 and 6 membered heterocyclic and benzheterocyclic wherein the hetero atoms are selected from oxygen, sulfur, and nitrogen, as well as amino, hydroxy, halogen, and cyano; R⁴ is a substituted and unsubstituted divalent hydrocarbon radical of 1 to 20 carbon atoms, such as alkylene of 1-20 carbons (preferably 1-10), cycloalkylene of 3-12 carbons (preferably 5-9), arylene (normally hydrocarbon arylene) of 6-14 carbons (preferably phenylene), aralkylene of 7-20 carbons (preferably phenalkylene of 7-12 carbons), or cycloalkylalkylene (i.e., a diradical of cycloalkylalkane or alkylcycloalkylalkyl) of 4-20 carbons (preferably 4-12); such divalent radicals optionally containing one or two nonterminal and non-adjacent hetero atoms selected from oxygen, nitrogen, and sulfur in the chain, the substituents borne by R⁴ being any of those defined herein for R¹; R¹¹ is tertiary alkyl containing 4 to 18 carbon atoms (preferably 4 to 8) or tertiary aralkyl containing 9 to 18 carbon atoms (preferably 9 to 12). Each of X, $X^1$, $X^2$, $X^3$, $X^4$ and $X^5$ is the same or different oxygen or sulfur.

The identity of the other substituents that satisfy the other valances for FORMULA I are quite immaterial so long as these azo compounds have the essential structure recited in FORMULA I. The particular embodiments that follow hereinbelow only serve to confirm this breadth of the invention.

In particular embodiments, the mono- and poly- azo compounds useful in accordance with this invention can be illustrated by FORMULA II.

FORMULA II $$\left[ R^5-N=N-\underset{\underset{R^7}{|}}{\overset{\overset{R^6}{|}}{C}}-Y \right]_n$$

wherein—
n is 1 or 2;
$R^5$ is

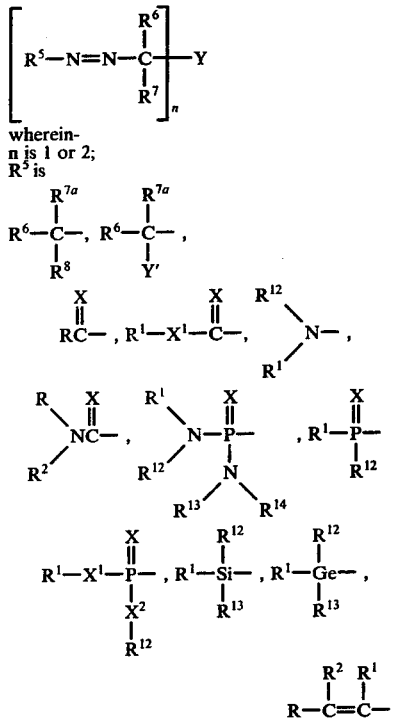

or one of the substituted or nonsubstituted hydrocarbon radicals defined herein for $R^1$ provided that any substituent borne by $R^5$ is not linked to the $R^5$ carbon atom directly attached to an azo nitrogen of FORMULA II; $R^{12}$, $R^{13}$, and $R^{14}$ are same or different radicals as defined for $R^1$;

$R^6$ is

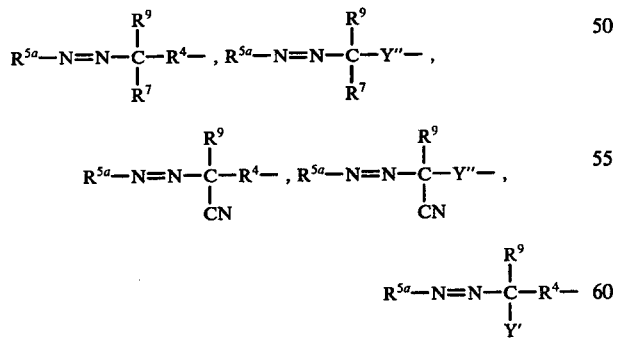

or one of the substituted or nonsubstituted hydrocarbon radicals defined herein for $R^1$;

$R^7$ is a substituted or nonsubstituted hydrocarbon radical containing 1 to 18 carbon atoms, such as alkyl of 1 to 12 carbons, cycloalkyl of 3 to 12 carbons, aralkyl of 7 to 15 carbons, and arcycloalkyl of 9 to 16 carbons wherein the substituent borne by $R^7$ is selected from the substituents defined herein for $R^1$;

$R^7$ can be hydrogen when Y is —OH or R–C(=O)O;

$R^6$ and $R^7$ may together form a ring (containing 4-12 carbons) with the carbon linked to the azo nitrogen;

$R^{7a}$ is the same as $R^7$ except it is not hydrogen;

$R^8$ is

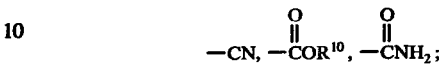

$R^9$ is the same as $R^6$ except it is not any of the azo radicals defined therefor;

$R^{10}$ is lower alkyl (1 to 6 carbon atoms) or cycloalkyl (5 to 6 carbon atoms);

Y is defined hereinbefore plus

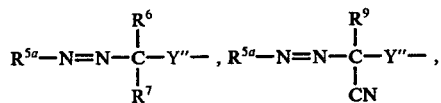

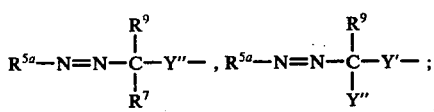

$Y''$ and $R^7$ taken together with the carbon linked to the azo nitrogen form a ring containing 4 to 12 atoms;

$Y'$ is a monovalent group that is the same as Y except $Y'$ is not

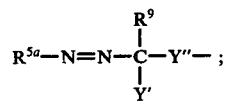

$Y''$ is the same as Y when Y is divalent;

$R^{5a}$ is the same as $R^5$ except that where $R^5$ is

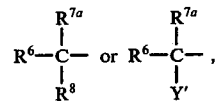

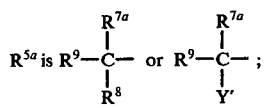

All other substituents in FORMULA II are defined as in FORMULA I. Examples of R, $R^2$ and $R^3$ radicals: hydrogen, methyl, ethyl, propyl, butyl, i-butyl, sec-butyl, tert-butyl, octyl, decyl, dodecyl, tridecyl, cyclopropyl, cyclobutyl, cyclopentyl, cyclohexyl, cyclooctyl, cyclodedecyl, bicyclo [2.2.1] heptyl, adamantyl, perhydronaphthyl, benzyl, α-cumyl, p-isopropyl-α-cumyl, phenylcyclopropyl, naphthylcyclohexyl, phenyl, naphthyl, phenanthryl, methylphenyl, triethylphenyl, cyclopropylphenyl, cyclohexylphenyl, ethenyl, allyl, 9-decenyl, 1-propenyl, 8-heptadecenyl, cyclohexenyl, cyclopentenyl, cyclododecenyl, 2-phenylethenyl, 2-ethoxycarbonylethenyl, p-benzoylphenyl, 2-pyridyl, 4-pyridyl, 2-pyrazinyl, 2-thienyl, 10-xanthenyl, 2-benzimidazolyl, 2-benzothiazolyl, 1-methyl-2-imidazolyl, furyl, and chloromethyl.

Examples of $R^4$ diradicals: ethylene, tetramethylene, dodecamethylene, ethyleneoxycarbonylethyl, trimethyleneoxycarbonylethyl, trimethylene ethyleneoxyethyl, tetramethyleneaminocarbonylbutyl, tetramethylenethiobutyl, hexamethylenethiooxycarbonylneopentyl, p-phenylene, 4,4'-biphenylene, octamethylene-p-phenyl, p-phenyleneoxycarbonylneopentyl, phenanthrylene, naphthylene, propenyleneaminocarbonyloxypentyl, cyclohexylene, cyclopentylene, cyclohexyleneoxycarbonyloxyisoheptyl, chlorophenylene, cyanonaphthylene, 3-phenylpentamethylene, phenylethylenecarbonyloxypropyl, cyclohexenylene, methylenecarbonyloxypropyl, acenaphthenylene, 2-butenylene, and pinanylene.

Examples of $R^1$, $R^5$, $R^6$ and $R^9$ radicals: methyl, ethyl, propyl, i-propyl, butyl, i-butyl, sec-butyl, tert-butyl, tert-amyl, t-hexyl, t-octyl, n-dodecyl, cyclopentadecyl, cyclopropyl, cyclobutyl, cyclopentyl, 1-methylcyclopentyl, cyclohexyl, 1-methylcyclohexyl, cyclooctyl, cyclododecyl, perhydronaphthyl, adamantyl, bicyclo[2.2.1]heptyl, 9,10-ethano-9,10-dihydro-9-anthracyl, benzyl, α-cumyl, p-phenyl-α-cumyl, 2-phenylcyclopropyl, 4-naphthylcyclohexyl, naphthylneopentyl, phenyl, naphthyl, phenanthryl, toluyl, xylyl, 4-ethyl-1-naphthyl, m-cyclopropylphenyl, p-cyclohexylphenyl, and triethylphenyl.

Additional $R^5$ radicals include propionyl, naphthoyl, isopropoxycarbonyl, triethylsilyl, tripropylgermanyl, carbamoyl, N-methylcarbamoyl, diethylamino, penten-2-yl, cyclopenten-1-yl, diethylphosphono, dibutylphosphinyl, bis-(diethylamino)-phosphinyl, dibutylphosphinothioyl.

Examples of $R^7$ radicals: same as for $R^5$ radicals except the aromatic radicals and "Additional $R^5$ radicals" are excluded, i.e., "phenyl, naphthyl, . . . and triethylphenyl", and "propionyl, . . . dibutylphosphinothioyl." inclusive.

Examples of $R^{10}$ radicals: methyl, ethyl, propyl, i-propyl, butyl, i-butyl, sec-butyl, tert-butyl, pentyl, hexyl, cyclopentyl, and cyclohexyl.

Examples of $R^{11}$ radicals: t-butyl, t-amyl, t-octyl, α-cumyl, p-isopropylcumyl, 1,1-dimethyl-hexadecyl, p-(α-cumyl)cumyl.

Examples of Substituents borne by $R^1$, $R^4$ through $R^7$ inclusive, $R^9$ and $R^{11}$: ethenyl, allyl, hexenyl, cyclopentenyl, methylcyclohexenyl, ethynyl, propynyl, hexynyl, cyclooctynyl, methoxy, ethoxy, propoxy, hexoxy, isopentoxy, methylcyclopentoxy, cyclohexoxy, phenoxy, naphthoxy, chlorophenoxy, dimethylphenoxy, ethylphenoxy, cyclohexylphenoxy, acetoxy, propionoxy, isohexanoyloxy, cyclohexanecarbonyloxy, benzoyloxy, naphthoyloxy, chlorobenzoyloxy, methylbenzoyloxy, methylnaphthoyloxy, carbamoyloxy, dimethylcarbamoyloxy, phenylcarbamoyloxy, methoxycarbonyloxy, propoxycarbonyloxy, cyclohexoxycarbonyloxy, methylphenoxycarbonyloxy, phenoxycarbonyloxy, chlorophenoxycarbonyloxy, naphthoxycarbonyloxy, methoxycarbonyl, ethoxycarbonyl, butoxycarbonyl, cyclohexoxycarbonyl, phenoxycarbonyl, naphthoxycarbonyl, chlorophenoxycarbonyl, methylphenoxycarbonyl, methylbiphenyloxycarbonyl, methoxycarbonylamino, ethoxycarbonylamino, isopropoxycarbonylamino, cyclohexoxycarbonylamino, phenoxycarbonylamino, naphthoxycarbonylamino, chlorophenoxycarbonylamino, methylphenoxycarbonylamino, methylnaphthoxycarbonylamino, acetyl, propionyl, valeroyl, cyclohexanecarbonyl, benzoyl, naphthoyl, tertiarybutylperoxy, tertiarybutylperoxycarbonyl, tertiarybutylperoxycarbonyloxy, benzoylperoxy, decanoylperoxycarbonyl, chlorobenzoyl, metholbenzoyl, methylnaphthoyl, carbamoyl, diethylcarbamoyl, methylcarbamoyl, phenylcarbamoyl, carboxy, chlorine, bromine, iodine, fluorine, hydroxy, cyanide, 2-furyl, amino, thiophenoxy, indolinyl, pyridyl, pyrazinyl, thienyl, furyl, xanthenyl, benzimidazolyl, benzothiazolyl, 1-methylimidazolyl, acetamino, benzoylamino, butylamino, phenylamino, diethylamino, cyclohexanecarbonylamino, thiobutyryl, dithiodecanoyl, thiobenzoyl, and dithionaphthoyl.

Examples of Substituents borne by R, $R^2$ and $R^3$: methoxy, ethoxy, propoxy, isopropoxy, butoxy, sec-butoxy, t-butoxy, phenoxy, parachlorophenoxy, ortho- meta- and paramethylphenoxy, hydroxy, methoxycarbonyl, ethoxycarbonyl, propoxycarbonyl, isopropoxycarbonyl, butoxycarbonyl, t-butoxycarbonyl, acetyloxy, propionyloxy, butyryloxy, valeroyloxy, hexanoyloxy, benzoyloxy, parachlorobenzoyloxy, 2,4-dichlorobenzoyloxy, naphthoyloxy, chloro, bromo, iodo, fluoro, acetyl, propionyl, butyryl, valeroyl, hexanoyl, 2-ethylhexanoyl, benzoyl, naphthoyl, cyano, N-methylamido, N,N-dimethylamido and N,N-diethylamido.

Examples of $R^6$ and $R^7$ linked together: trimethylene, pentamethylene, heptamethylene, decamethylene, tetramethylene, 1,1,3,3-tetramethylpropylene, undecamethylene, and 1,2, or 3-methylpentamethylene.

Examples of R and $R^2$ linked together: same as for Examples $R^6$ and $R^7$ linked together, plus ethylene.

Examples of Y radicals: chlorine, bromine, acetoxy, propionoxy, formyloxy, methacryloxy, butyryloxy, undecelynoyloxy, lauroyloxy, decanoyloxy, cyclopropylcarbonyloxy, cyclohexanecarbonyloxy, cyclododecanecarbonyloxy, cyclohexenecarbonyloxy, propargyloxy, phenylacetoxy, phenoxyacetoxy, pivaloyloxy, 2-ethylhexanoyloxy, pelargonoyloxy, 3-ethoxycarbonylpropionoxy, 4-ethoxycarbonylbutyryloxy, 5-methoxycarbonylvaleryloxy, 9-ethoxycarbonylpelargonoyloxy, hydroxypivaloyloxy, cyanoacetoxy, 3-methoxypropionoxy, 6-acetoxyhexanoyloxy, 6-benzyloxycarbonylaminohexanoyl-oxy, benzoyloxy, naphthoyloxy, phenanthrenecarbonyloxy, toluoyloxy, methoxy, ethoxy, isopropoxy, dodecyloxy, cyclohexyloxy, cyclopropyloxy, cyclododecyloxy, benzyloxy, α-cumyloxy, phenoxy, naphthyloxy, phenanthryloxy, m-methylphenoxy, p-methylphenoxy, methylamino, butylamino, dodecylamino, N-methylanilino, phenylamino, diethylamino, methylaminothiocarbonylamino, butylaminothiocarbonylamino, dodecylaminothiocarbonylamino, butylaminocarbonylamino, ethoxycarbonylamino, isocyanato, isothiocyanato, cyanato, thiocyanato, ethoxythiocarbonylamino, perchloroacryloxy, perfluoro-9-methyldecanoyloxy, 4-acetylbutyryloxy, adamantylacetoxy, 3-aminobutyryloxy, p-aminothiophenoxyacetoxy, m-bromocinnamoyloxy, cyanoacetoxy, 4-chlorobutyryloxy, propionyloxy, cyclohexylacetoxy, 3,4-dimethoxycinnamoyloxy, diphenylacetoxy, 3-ethoxycarbonylacryloxy, 4-hydroxybutyryloxy, 3-indolinylacryloxy, iodoacetoxy, tridecanoyloxy, 2-naphthylacetoxy, 3-phenoxypropionoxy, 2-pyridylacetoxy, pyruvoyloxy, 9-anthracenecarbonyloxy, 4-benzoylbenzoyloxy, 2-hydroxy-benzoyloxy, 1-methylcyclohexanecarbonyloxy, isonicotinoyloxy, 2-pyrazinecarbonyloxy, 2-thiphenecarbonyloxy, 10-xanthenecarbonyloxy, 3-acetamidophenoxy, 2-allylphenoxy, 1-amino-2-naphthoxy, 4-cyanophenoxy, 4-acetamidothiophenoxy, allylthio, butoxycarbonylmethylthio, cyclohexylthio, 2-furylmethylthio, 2-thiobenzimidazole, 2-thiobenzothiazole, 2-thio-1-methylimidazole, 2-pyridylthio, isopropylthio, t-butylthio, octylthio, dodecylthio, 2-hydroxyethylthio, thiophenoxy, p-t-butylphenylthio, hydroxy, thioacetoxy, dithioacetoxy, and thiobenzoyloxy, sulfur, oxygen, ethylenedioxy, trimethylenedioxy, hexamethylenedithioxy, hexamethylenediamino, decanedithio, phenylenedioxy, naphthylenedioxy, phenanthrylenedithioxy, oxyhexamethylenethioxy, oxyphenylenethioxy, aminophenyleneoxy, aminohexamethylenethioxy, hydroperoxy, t-butyl peroxy, t-octyl peroxy, t-cumyl peroxy and 1-methyl cyclohexyl peroxy.

Some Typical Examples of Cyclic Azo Compounds gamma-t-Butylazo-gamma-valerolactone
2-t-Butylazo-2-methyl-tetrahydrofuran
2-t-Butylazo-2-methylpiperidine
gamma-t-Butylazo-thio-gamma-valerolactone
gamma-t-Butylazo-gamma-dithiovalerolactone
gamma,gamma'-Azobis(gamma-valerolactone)
2,2'-Azobis(2-methyl-tetrahydrofuran)
2,2'-Azobis(2-methyl-tetrahydrothiopyran)
2,2'-Azobis(2-methylpiperidine)
gamma,gamma'-Azobis(thio-gamma-valerolactone
gamma,gamma'-Azobis(gamma-dithiovalerolactone)
2-t-Butylazo-2-methyl-tetrahydrothiopyran The following acid sensitive bis azo compounds, the preparation of which is described in U.S. Pat. No. 3,957,750 issued May 18, 1976, are also included within the scope of this invention:

Ethylene Bis(4-t-butylazo-4-methoxypentyl carbonate)
Ethylene Bis[4-t-butylazo-4-(p-t-butylthiophenoxy)-pentyl carbonate]
Ethylene Bis(4-t-butylazo-4-thiocyanopentyl carbonate)
Ethylene Bis(4-t-butylazo-4-phenoxypentyl carbonate)
Ethylene Bis[4-t-butylazo-4-(octylthio)pentyl carbonate]
2,2-Bis[4-(1-(t-butylazo)cyclohexoxy)phenyl]propane
Bis(1-t-butylazo-1,3-dimethylbutyl)ether
1,4-Bis[1-(t-butylazo)-1,3-dimethylbutoxy]butane
Di(1-t-butylazo-1,3-dimethylbutyl)succinate
Bis(1-t-butylazo-1,3-dimethylbutyl)sulfide
Di(1-t-butylazo-1-cyclohexyl)sulfide
Di(1-t-butylazo-1-methylethyl)sulfide
1,6-Di[1-(t-butylazo)-1,3-dimethylbutylthio]hexane
1,4-Cyclohexylenedimethyl Bis[2-(t-butylazo)isopropyl carbonate]
S,S-1,6-Hexylene Bis[2-(t-butylazo)isopropyl thiocarbonate]

The following acid sensitive azo peroxides whose preparation is described in U.S. Pat. No. 3,812,095 issued May 21, 1974 (which is incorporated herein by reference) by Sheppard, MacLeay and Bafford also fall within the scope of this invention:

2-(t-Butylazo)-2-Chloro-4-methyl-4-(t-butylperoxy)-pentane
2-(t-Butylazo)-2-phenoxy-4-methyl-4-(t-butylperoxy)pentane
2-(t-Butylazo)-2-(p-t-butylthiophenoxy)-4-methyl-4-(t-butylperoxy) pentane
2-(t-Butylazo)-2-thiocyano-4-methyl-4-(t-butylperoxy)pentane
2-(t-Butylazo)-2-dodecanethiol-4-methyl-4-(t-butylperoxy)-pentane
2-(t-Butylazo)-2-thioacetoxy-4-methyl-4-(t-butylperoxy)pentane
t-Butyl 4-(t-Butylazo)-4-(thiophenoxy)peroxyvalerate
Di[4-(t-butylazo)-4-(thiophenoxy)valeryl]Peroxide
t-Butyl 4-(t-Butylazo)-4-(p-t-butylthiophenoxy)-peroxyvalerate
Di[4-(t-butylazo)-4-(p-t-butylthiophenoxy)valeryl]-Peroxide
1,1,3,3-Tetramethylbutyl 4-(t-Butylazo) 4-(p-t-butylthiophenoxy) peroxyvalerate The following acid sensitive dual temperature azo compounds whose preparation is described in U.S. Pat. No. 3,649,614 (the contents of which are incorporated herein by reference) also fall within the scope of this invention.

2,2'-Azobis[2-(4-t-butylazo-4-cyanovaleroyloxy)-4-methylpentane] 3 azo groups - only one is acid sensitive
Di(1-t-butylazo-1,3-dimethylbutyl)4,4'-Azobis(4-cyanovalerate) 3 azo groups - only two are acid sensitive
2-t-Butylazo-1,3-dimethylbutyl 4-t-Butylazo-4-cyanovalerate 2 azo groups - only one is acid sensitive The following acid sensitive dual temperature azo compounds whose preparation is described in U.S. application Ser. No. 234,377 filed Mar. 13, 1972, now abandoned, and in Application 474,748 filed 5-30-74 (the contents of which are incorporated herein by reference) also fall within the scope of this invention:

4-t-Butylazo-4-methyl-3-thiapentyl 4-t-Butylazo-4-cyanovalerate
2 azo groups - only one is acid sensitive
4-t-Butylazo-4,6-dimethyl-3-thiaheptyl 4-t-Butylazo-4-cyanovalerate
2 azo groups - only one is acid sensitive
1-Methyl-1-(2-(t-butylazo)-2methyl-1-thiapropyl)-4-(3-(t-butylazo)-1, 1,3-trimethyl-2-thiabutyl)cyclohexane
2 azo groups - both are acid sensitive
Di(4-t-butylazo-4,6-dimethyl-3-thiaheptyl) 4,4'-Azobis(4-methyl-3-thiapentyl)Dicarbonate
2 azo groups - both are acid sensitive
Di(4-t-butylazo-4-methyl-3-thiapentyl) 4,4'Azobis(4-cyanovalerate)
3 azo groups - only two are acid sensitive
2-t-Butylazo-isopropyl 4-t-Butylazo-4-methyl-3-thiapentyl Carbonate
2 azo groups - both are acid sensitive
2,2'-Azobis(5-(4-t-butylazo-4-cyanovaleroyloxy)-2-methyl-3-thiapentane
3 azo groups - only one is acid sensitive
2,2'-Azobis(7-t-butylazo-2,7,9-trimethyl-3-thia-6-oxa-decane)
3 azo groups - all 3 are acid sensitive
6-Methyl-6-t-butylazo-5-oxaheptyl 4-t-Butylazo-4-cyanovalerate
2 azo groups - only one is acid sensitive
2,2'-Azobis[5-(4-t-butylazo-4-(p-t-butylthiophenoxy)-valeroyloxy)-2-methyl-3-thiapentane]
3 azo groups - all 3 are acid sensitive
2,7-Di(t-butylazo)-2,7-dimethyl-3-thia-6-oxaoctane
2 azo groups - both are acid sensitive
4-t-Butylazo-4,6-dimethyl-3-thiaheptyl 3-[2-(t-butylazo)-isopropyl-thio]propionate 2 azo groups - both are acid sensitive
2,2'-Azobis [5-[(5-t-butylazo)-5-methyl-4-thiahexanoyloxy]-2-methyl-3-thiapentane]
3 azo groups - all 3 are acid sensitive
2-t-butylazoisopropyl 3[2-(t-butylazo)isopropylthio]-propionate
2 azo groups - both are acid sensitive
2,7-Di(t-butylazo)-2-methyl-3-oxa-7-cyanooctane
2 azo groups - only one is acid sensitive
Di(4-t-butylazo-4,6-dimethyl-3-thiaheptyl)4,-4'Azobis(4-cyanovalerate)
3 axo groups - only two are acid sensitive

SUITABLE POLYMERIZABLE MEDIUMS

"A" Type Mediums:

Specific suitable unsaturated polyesters useful as reactive "resins" in the process of the present invention are, for instance, polyesters as they are obtained by esterifying preferably ethylenically unsaturated di- or polycarboxylic acids or their anhydrides or their acid halides, such as maleic acid, fumaric acid, glutaconic acid, itaconic acid, mesaconic acid, citraconic acid, allyl malonic acid, allyl succinic acid, tetrahydrophthalic acid, 2,3-dicarboxybicyclo (2.2.1) heptene and others, with saturated or unsaturated di- or polyalcohols, such as ethylene glycol, diethylene glycol, triethylene glycol, 1,2- and 1,3-propanediols, 1,2-, 1,3- and 1,4-butanediols, 2,2-dimethyl-1,3-propanediol, 2-hydroxymethyl-2-methyl-1,3-propanediol, 2-buten-1,4-diol,2-butyn-1,4-dio,2,2,4-trimethyl-1,3-pentanediol, glycerol, pentaerythritol, mannitol and others. Mixtures of such polyacids and/or mixtures of such polyalcohols may also be used. The unsaturated di- or polycarboxylic acids may be replaced, at least partly, by unreactive, saturated polycarboxylic acids, such as adipic acid, succinic acid, sebacic acid and others and/or by aromatic polycarboxylic acids, such as phthalic acid, trimellitic acid, pyromellitic acid, isophthalic acid and terephthalic acid. The dibasic acid may be polymeric with terminal carboxylic acid groups, such as those prepared by polymerizing monomers such as styrene, butadiene, isoprene and chloroprene with initiators containing carboxylic acid groups in each initiating fragment, i.e., 4,4'-azobis-(4-cyanovaleric acid) or by treating living anionic polymers with carbon dioxide. These mediums may contain a mixture of two or more different polymers, one or more of which is active.

Other Type "A" Mediums consist of polymeric active resins containing one or more terminal and/or pendant functional groups that undergo free radical reaction. The polymeric molecules have the general formula:

$$P — (M)_m$$

where P is a mono- or polyvalent polymeric residue of a polymer i.e. $P — (H)_m$ (with at least one hydrogen atom removed) selected from: polyesters polyamides, polyethers, polycarbonates, polyurethanes, polystyrene, polybutadiene, polyacrylate, polymethacrylate, polyethylene, poly(vinyl acetate), poly(vinyl chloride), poly(vinylpyridine), polyisobutylene, poly(vinylpyrrolidone), poly(vinylcarbazole), poly(vinylidene chloride), poly(vinylidene fluoride), poly(alpha-methylstyrene), poly(chlorostyrene), polyacrylonitrile, poly(methacrylonitrile), polychloroprene, polyisoprene, and copolymers and terpolymers thereof, as well as copolymers and terpolymers of ethylene, propylene and dienes. In the formula $P — (M)_m$ where $m = 1$ or more, M is selected from:

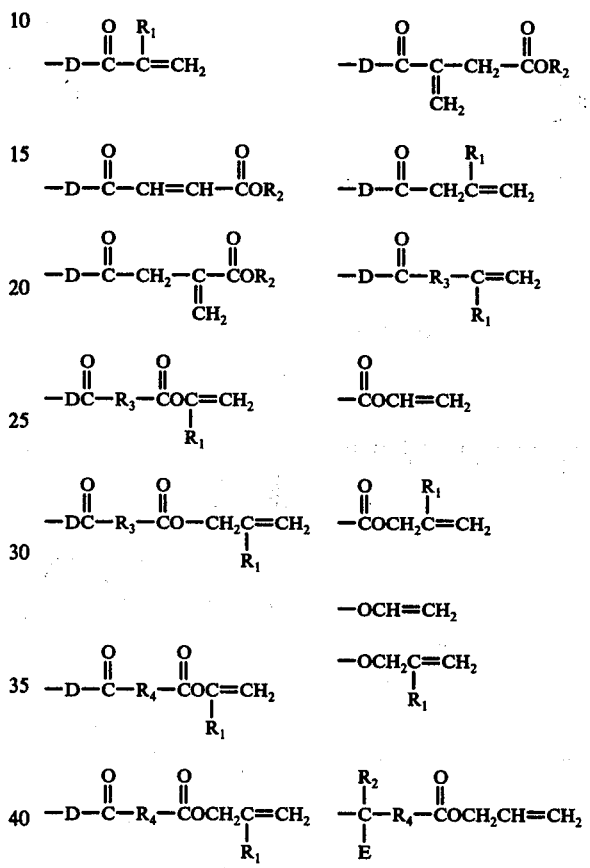

$R_1 = H—$ or $CH_3—$
$R_2 =$ lower alkyl of 1 to 6 carbons
$R_3 =$ phenylene or naphthylene
$R_4 =$ alkylene of 1 to 8 carbons $D = —\overset{H}{N}—$ or $—O—$ $E = —CN, —\overset{O}{\overset{\|}{C}}OR_5, —\overset{O}{\overset{\|}{C}}NH_2, —OR_5, —SR_5,$

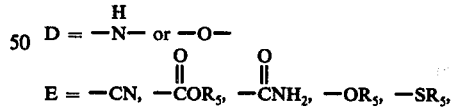

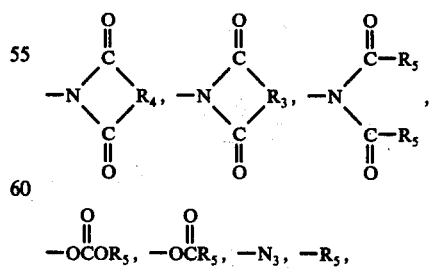

$R_5 =$ lower alkyl of 1 to 6 carbons, aryl of 6 to 12 carbons, and cycloalkyl of 5 to 8 carbons.

Other examples of M groupings in $P(M)_m$ where $m = 2$ or more:

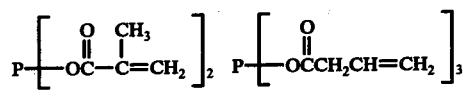
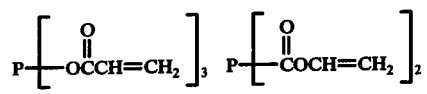
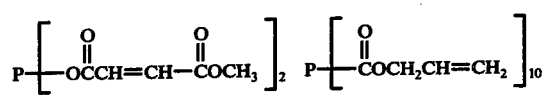
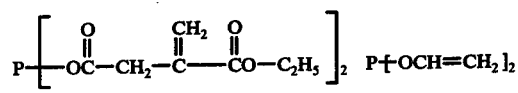
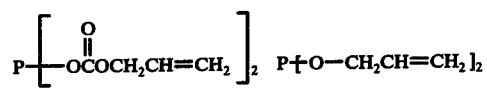
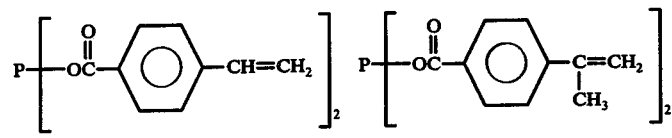
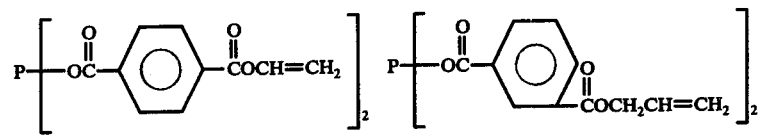
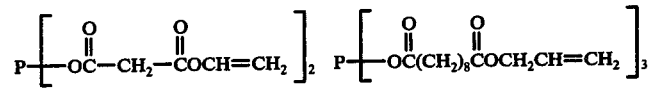
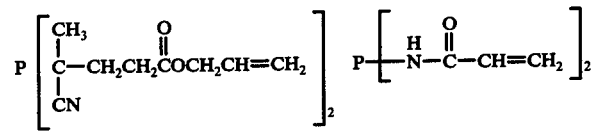
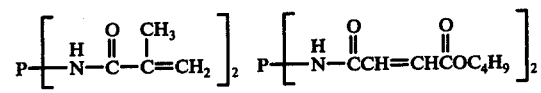
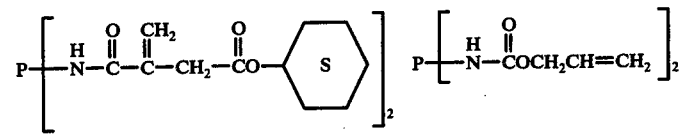
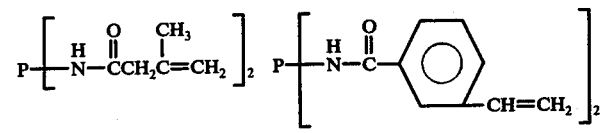
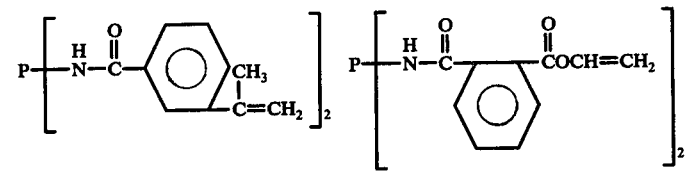

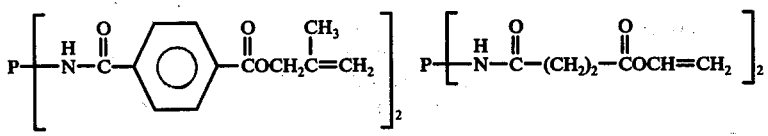

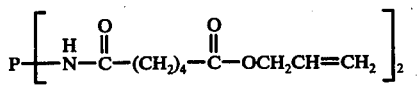

The polymeric active resins, P(M)$_m$, may be prepared by several known methods, see for example, Ser. No. 548,946.

Some examples of P-(H)$_m$ suitable for preparing reactive resins of the P-(M)$_m$ variety are given below: polystyrene, polybutadiene(cis-1,2, cis-1,4, trans 1,2, trans 1,4, and mixtures thereof), poly(ethyl acrylate), poly(methyl methacrylate), polyethylene, poly(vinyl acetate), poly(vinyl chloride), poly(vinylpyridine), polyisobutylene, poly(vinylpyrrolidone), poly(vinyl carbazole), poly(vinylidene chloride), poly(vinylidene fluoride), poly(α-methylstyrene), poly(chlorostyrene), polyacrylonitrile, poly(methacrylonitrile), polychloroprene, polyisoprene, ethylene propylene copolymer, ethylene-propylene-norbornadiene terpolymer, ethylene-propylene-1,4-hexadiene terpolymer, ethylene-propylene ethylidenenorbornene terpolymer, acrylonitrile-butadiene-styrene terpolymer and mixed copolymers, ethylene vinyl acetate copolymer, styrene-butadiene copolymer, styrene methyl methacrylate copolymer, polyester of adipic acid and ethylene glycol, polyester of succinic acid and diethylene glycol, polyamide of sebacic acid and hexamethylenediamine, polycarbonate of butanediol bis chloroformate and bisphenol A (i.e. 2,2-di(4-hydroxyphenyl)propane), polyurethane of hexanediol bischloroformate and ethylenediamine, polyether of bisphenol A and propylene oxide, and poly(ethylene oxide). Combinations of 2 or more of these polymeric materials may be used as a polymerizable medium.

"B" Type Mediums

These mediums consist of a polymer or mixture of polymers dissolved and/or dispersed in a monomer or a mixture of monomers. A wide variety of polymers can be used. A partial list of reactive polymers is given in the description of "A" Type Mediums. In addition, a wide variety of polymers which are unreactive [P(H)$_m$] to free radical polymerization or cross-linking reactions may also be used. Note that the polymers and/or the monomer may also contain other functional groups which can undergo polymerization or crosslinking reactions by non-radical mechanisms.

Among reactive resins useful in "B" Type Mediums are included those resins which are terminated by polymerizable unsaturated ester functions but wherein the polymer repeating units may or may not be of the polyester type, for example, polyethers terminated with acrylic acid ester groups, blended with suitable copolymerizable monomers. These may be cured to hard thermosets by means of free radical curing agents. A typical series of such resins are commercially available from Dow Chemical Corporation under the trade mark "Derakane" resins and generally comprise polyethers prepared from an epoxide (e.g., glycidol) and a bisphenol (e.g., 2,2-di(4-hydroxyphenyl) propane or bisphenol A) which are terminated by acrylic acid ester functions and blended with styrene. A preferred resin medium contains the esterification products of propylene glycol with maleic anhydride and phthalic anhydride in admixture with styrene as a monomer component. That resin is referred to hereinafter as the Standard Unsaturated Polyester Resin. Among suitable copolymerizable monomers useful in "B" Type Mediums are ethylenically unsaturated monomers such as styrene, vinyl toluene, methyl methacrylate, diallyl phthalate, dibutyl fumarate, acrylonitrile, triallyl cyanurate, α-methyl styrene, divinyl benzene, methyl acrylate, diallyl maleate, n-butyl methacrylate and ethyl acrylate. A partial list of other such monomers follows:

| acrylic acid | methacrylic acid | p-methylstyrene |
| butyl acrylate | methacrylonitrile | vinyl acetate |
| butadiene | p-chlorostyrene | vinylpyridine |
| isoprene | p-methoxystyrene | |

It is preferred to select the polymer-monomer pair in such a way that the polymer can be dissolved in the monomer. The ratio of polyester to monomer or monomer mixture may vary over a wide range. Generally a ratio of polyester: monomer between about 0.2:1 to 4:1 is suitable.

"C" Type Mediums

These mediums consist of a free radically reactive polymer or mixture of polymers dissolved in an unreactive diluent or mixture of diluents. Unreactive polymers may also be incorporated. A partial list of appropriate polymers are described in ""A" Type Mediums."These diluents may be used to obtain viscosity and other physical properties of the resultant foam or attractive economics.

Examples of such diluents are:

| acetone | butyl benzyl phthalate | pentane |
| tetrahydrofuran | butyl octyl phthalate | cyclohexane |
| 1,4-dioxane | di-(2-ethyl hexyl) phthalate | benzene |
| methyl ethyl ketone | dioctyl adipate | decane |
| hexane | dibutyl sebacate | |

"D" Type Mediums

These mediums consist of a wide variety of monomers and mixtures of monomers which are capable of free radical polymerization. Examples of such monomers are given in ""B" Type Medium" (wherein they are used to dilute polymeric materials).

"E" Type Mediums

Combinations of any or all of 'A', 'B', 'C', and 'D' Type Mediums can be used. In addition said reactive Mediums may also be mixed with other mediums which undergo polymerization and/or crosslinking by other mechanisms, i.e., epoxy resins and phenol formaldehyde resins, e.g., butyl glycidyl ether, phenul glycidyl ether, and 4-methylphenyl glycidyl ether. Also included are monomers containing both an epoxy group and free radically polymerizable unsaturated function, e.g., glycidyl methacrylate and allyl glycidyl ether. Also included are typical di- or polyfunctional epoxy resins, the technology of which is well known.

Fillers

Fillers may be used as components in any of the reactive mediums described above following techniques well known to those skilled in the art of casting and molding resins. Fillers improve fabrication and handling characteristics, reduce shrinkage, lower cost, and improve physical properties. A wide variety of fillers have been found to be compatible with the foaming process of this invention. Milled fiberglass and cotton flock are re-enforcing fillers and tend to increase green strength, compressive strength and impact strength. Bulk fillers such as wood flours, clays, carbonates and silicates decrease the cost and reduce thermoexpansion and shrinkage. Mineral fillers such as borax and alum are known to effectively reduce the burning rates. Examples of fillers include the following: pecan shell flour, milled fiberglass, wood chips, sawdust, vermiculite, carbon black, magnesium sulfate, cotton flock, calcium carbonate, mica steel wire, aluminum powder, polystyrene powder, polypropylene powder, polyethylene powder, polyvinylchloride powder, and powdered cross-linked butadiene-acrylonitrile rubber.

Activators

Both organic and inorganic Bronsted-Lowry acids (substances which will dissociate a proton) have been found effective in activating acid sensitive azo compounds of this invention to evolve gas. Representative examples are:

| Inorganic Acids | Organic Acids |
|---|---|
| hydrochloric | acetic |
| hydrofluoric | formic |
| hydrobromic | methane sulfonic |
| nitric (dilute) | maleic |
| nitrous | 4,4'-azobis-(4-cyanovaleric) |
| sulfuric | 4-t-butylazo-(4-cyanovaleric) |
| sulfurous | adipic |
| phosphoric | oxalic |
| phosphorous | propionic |
| perchloric | succinic |
|  | benzoic |
|  | phthalic |
| Esters | tri-chloro-acetic |
| maleic monoesters | tri-fluoro-acetic |
| phthalic monoesters | carboxylic acid substituted with electron withdrawing groups |
|  | acrylic acid |
|  | methacrylic acid |
|  | carboxy-containing polymers (of "A" Medium) |

Representative examples of acyl alkyl(cycloalkyl)sulfonyl peroxides useful as activators are:
  acetyl cyclopentylsulfonyl peroxide
  acetyl cyclohexylsulfonyl peroxide
  acetyl methylcyclohexylsulfonyl peroxide
  acetyl cyclooctylsulfonyl peroxide
  acetyl tert-butylsulfonyl peroxide
  acetyl tert-amylsulfonyl peroxide
  acetyl sec-hexylsulfonyl peroxide
  acetyl sec-heptysulfonyl peroxide
  acetyl tert-dodecylsulfonyl peroxide
  acetyl sec-eicosylsulfonyl peroxide
  acetyl adamantylsulfonyl peroxide
  acetyl sec-norbornylsulfonyl peroxide
  acetyl 3-chloro-1-methylpropylsulfonyl peroxide
  acetyl 3-chloro-1,1-dimethylpropylsulfonyl peroxide
  acetyl 1-cyano-sec-heptylsulfonyl peroxide
  acetyl 1-acetoxy-2-ethylhexanesulfonyl peroxide
  acetyl 1-methoxycarbonylundecanesulfonyl peroxide
  propionyl cyclohexylsulfonyl peroxide
  n-butyryl cyclohexylsulfonyl peroxide
  00,00-bis(cyclohexylsulfonyl)diperoxysuccinate
  propionyl cyclopentylsulfonyl peroxide

Curing Agents

Curing agents enhance the cure reaction effected by the acid sensitive azos hereof and improve the physical properties of the resultant polymeric foam. Free radical initiators such as peroxides and azos (in addition to the acid sensitive azo compounds of this invention) are effective.

Representative examples are:

| Organic Peroxides | |
|---|---|
| benzoyl peroxide | t-butyl peroctoate |
| acetyl peroxide | di-t-butyl diperphthalate |
| di-t-butyl peroxide | t-butyl perbenzoate |
| dicumyl peroxide | 2,5-dimethyl-2,5-bis-(benzoylperoxy)-hexane |
| methyl ethyl ketone peroxides | 2,5-dimethyl-2,5-di-(t-butylperoxy)-hexane |
| di-(sec-butyl) peroxydicarbonate | t-butyl hydroperoxide |
| diisopropyl peroxydicarbonate | cumene hydroperoxide |
| t-butyl peracetate | 2,2-bis(t-butylperoxy)-butane |

A large number of other peroxides known for curing resins, such as polyesters and other polymers, are operable in this invention. The curing of polyester resins, without foaming, is well known art and all known curing agents for these resins can be used in conjunction with the foaming systems of this invention.

Also included as curing agents are conventinal azo curing compounds other than the acid sensitive ones useful in this invention. Examples of such azo curing agents are:
  azobisisobutyronitrile
  azocumene
  2-t-butylazo-2-cyano-4-methoxy-4-methylpentane
  2-t-butylazo-2-cyano-4-methylpentane
  4-t-butylazo-4-cyanovaleric acid
  1-cyano-1-(t-butylazo)-cyclohexane
  2,2'-azobis(2,4-dimethylvaleronitrile)

Azo compounds of the foregoing class effect polymerization or curing but no foaming when reacted in a polymerizable medium. Also included in this class of compounds are those containing both azo and peroxide functions such as
  di-t-butyl 4,4'-azobis-(4-cyanoperoxyvalerate) and
  1,3-dimethyl-3-(t-butylperoxy)butyl4-t-butylazo-4-cyanovalerate Other free radical generating compounds or systems have also been used to cure unsaturated polyester resins such as certain hexa-substituted ethanes, e.g. 1,2-dicyano-1,2-di(methoxycarbonyl)-1,2-di-(4-methylphenyl)ethane, or certain photo-initiators or photosensitizers in the presence of ultraviolet irradiation, e.g. benzoin methyl ether. These also include transition metal salts (cobalt, copper, iron, etc.) in combination with specific reactant compounds such as certain halohydrocarbons, hydrazine derivatives, etc. Such curing agents are wellknown in the art and can be used in conjunction with the foaming system of this invention; for example the addition of certain transition metal salts such as copper naphthenate accelerates both the foaming and curing reaction in the present invention.

Vaporizing Adjuvants

Vaporizing adjuvants enhance the amount of foaming effected by the acid sensitive azo compounds hereof. Effective compounds have boiling points such that they become gaseous during the early portions of the cure reaction; i.e., below 100° C.
Representative examples are:

| | | |
|---|---|---|
| pentane | trans-2-butene | $C_2F_3Cl_3$ |
| hexane | 1-butene | isoprene |
| heptane | 1-pentene | iso-pentane |
| cis-2-butene | 1-hexene | neo-pentane |
| | $CFCl_3$ | |

Other compounds that vaporize below 100° C, can be used as well. In some cases less volatile compounds (having boiling points higher than 100° C) can be used to enhance foaming.

Nucleation And Stabilization Agents

A considerable variety of surfactants have been used in the preparation of urethane foams. They are also effective in the preparation of polymeric foams hereof. These products serve to reduce the surface tension of the system and to aid in nucleation and bubble stabilization. Anionic, cationic and non-ionic surfactants all can be used.
Representative examples are:

| |
|---|
| Tergitol NPX - Nonyl phenyl polyethylene glycol ether Union Carbide Corporation (non-ionic) |
| Igepal CO 430 - Nonyl phenoxy poly(ethyleneoxy)ethanol (GAF) (non-ionic) |
| Monawet MT 70 - di-tridecyl sodium sulfosuccinate (Mona Industries) (anionic) |
| Triton X 400 - stearyl dimethyl benzyl ammonium chloride (Rohm & Haas) (cationic) |
| Triton X 200 - sodium salt of alkylaryl polyether (Rohm & Haas) sulfonate (anionic) |

Adjuvants

Adjuvants having densities less than that of the polymerized matrix can contribute to a decrease in density of the system along with the gas bubbles generated from the decomposition of acid sensitive azo compounds hereof. They may be utilized to impart certain desired properties to the foam. Hollow ceramic, glass or graphite spheres may be used in this capacity. For example, Eccospheres (registered trademark of Emerson & Cuming, Inc.) IG-100 have been employed. This material consists of hollow sodium borosilicate glass spheres of 10–250 microns and diameter with a true particle density of 0.31 grams/cc.

Component and Temperature Variables

A wide range of proportions among the components of the active polymerizable mediums is possible in the practice of the present invention as is a broad range of temperature variables. Utilization ranges (with percentages based on weight of polymerizable medium) of the various parameters are listed below:

| Parameter | Broad Range | General Operating Range | Preferred Range |
|---|---|---|---|
| Acid Sensitive Azo Compounds | 0.02 to 15 wt% | 0.2 to 8 wt% | 0.5 to 4 wt% |
| Activators | 0 to 99.9 wt% | 0.0 to 10 wt% | 0.0 to 6 wt% |
| Curing Agents | 0.0 to 10 wt% | 0.05 to 5 wt% | 0.1 to 2 wt% |
| Vaporizable Adjuvants | 0.0 to 20 wt% | 0.0 to 10 wt% | 0.0 to 4 wt% |
| Nucleation and Stabilization Agents | 0.0 to 5 wt% | 0.25 to 2 wt% | 0.5 to 1.5 wt% |
| Low Density Adjuvants | 0.0 to 30 wt% | 0 to 25 wt% | 0 to 20 wt% |
| Fillers | 0.0 to 60 wt% | 0.0 to 30 wt% | 0 to 10 wt% |
| Temperatures | −20 to 200° C | 15 to 100° C | 21 to 60° C |

The relative proportion of each acid sensitive azo compound is best determined by experiment, however, where two acid sensitive azo compounds are used, the ratio is generally in the range of 20 of one azo to 1 of another (more usually, 10/1 to 1/10), with 1:1 being a good choice for an initial trial.

Examples

The following examples are cited to illustrate the invention and advantages of the invention. They are not intended to limit it in any manner.

To permit comparative evaluations, unless otherwise stated in the Examples, a Standard Unsaturated Polyester Resin was employed. It was made by reacting maleic anhydride (1.0 mol), phthalic anhydride (1.0 mol), and propylene glycol (2.2 mols) until an acid number of 45–50 was obtained. To this was added hydroquinone at 0.013% concentration. Seven parts of this unsaturated polyester were diluted with three parts of monomeric styrene to obtain a homogenous blend having a viscosity of 21 to 25 poise and a specific gravity of 1.14 (The specific gravity of blend after curing in the absence of a foaming agent was 1.25 —obtained by mixing 100 g. of said resin with 1 g. methyl ethyl ketone peroxide, then mixing therewith 0.2 g. of a 6% solution of Co naphthenate—gel time of 5.5 minutes, a cure time of 12 minutes and a peak exotherm of 330° F.)

Unless otherwise indicated in the Examples, the foam structure made from the Standard Resin was made by mixing 100 grams of the Standard Unsaturated Polyester Resin with 0.2 gram Lupersol DDM (Lucidol's methyl ethyl ketone peroxide formulation) or 0.05 to 1.0 gram t-butyl peroxy-benzoate and the desired number of grams of the azo compound (see column labeled Parts Azo) using an electric stirrer. Finally, the appropriate number of grams of an activator, (if required see columns labeled Activator and Parts Activator) was mixed into the formulation. The mixture was poured into a waxed cup at ambient temperature (75° F) and allowed to foam and cure. The foaming and curing were complete in less than 30 minutes. After the foams had cooled to room temperature the foam density was determined in grams/cc. (see column labeled Foam Density).

The activator acetyl sec-hexylsulfonyl peroxide is designated as $AH_6SP$ in the Examples. Where used, it was added as a 50% solution in dimethyl phthalate. The activator acetyl cyclohexylsulfonyl peroxide is designated as ACSP in the Examples, and where used, it was added as a 30% solution in dimethyl phthalate. The phosphoric acid when used as the activator was 86% by weight and the sulfuric acid when used was 60% by weight aqueous solutions.

Examples 1–11 inclusive, are intended to illustrate the wide variety of acid sensitive azo compounds useful in the present invention as employed with a variety of solvents, activators and the like. They are also intended to illustrate the experimental procedure which can be used to determine which azo compounds to use and in what relative proportions in order to produce a foam of a given density, hardness, etc. from a particular polymerizable or cross-linkable material.

Example 1 shows apparent synergistic effect of using two acid sensitive azos having very similar chemical structure.

Example 2 shows the use of two acid-sensitive azos where a strong acid is preferred in the process and where the same acid is used with the combination of the two azos as with each individual azo. Example 3 can be found in Ser. No. 548,946 (as Example 19) and illustrates the use of two azo compounds having appreciably different acid sensitivities. Examples 4 and 5 further illustrate the properties of the individual azo compound in Example 3, 2-t-butylazo-2-(t-butylperoxy) propane and show that it can produce curing and foaming in the presence of a strong acid.

Example 4 also illustrates an unsaturated polyester syrup made using methacrylonitrile as one source of the unsaturation.

Examples 6 and 7 show the group Y in Formula I herein can be hydroperoxy, that is, hydroperoxy azos such as 2-t-butylazo-2-hydroperoxy-4-methyl pentane can be used to produce foam and cure in the process of Ser. No. 548,946.

Examples 8 and 9 show the use of a combination of two azo peroxy compounds to foam and cure in the process of the present invention, these compounds being 2-t-butylazo-2-(t-butylperoxy) propane and 2-t-butylazo-2-hydroperoxy-4-methyl pentane.

Example 10 illustrates the use of mixtures of certain chloro azo thio compounds to cure and foam a polyester. Example 10 can also be found in Ser. No. 548,946 (as Examples 5-100, 5-101 and 5-102).

Example 11 illustrates the use of mixtures of certain chlorazo isothiocyanato and isocyanato derivatives to foam and cure the standard polyester. Example 11 can also be found (as Examples 6-20, 6-21, 6041, 6-42 and 6-43) in Ser. No. 548,946.

EXAMPLE 1

Using Multiple Azo Compounds to Foam and Cure Polyesters

In data given below, the extent of cure was determined by a Shore hardness tester. (1) The formulations were prepared by blending in 9 oz. waxed paper cups, 60 g. of polyester resin (2) and 40 g. of hydrated alumina (3), using an electric mixer. The indicated quantities of foaming agents were then added and mixed at high speed for 20 seconds. 45 g. of the mixtures were then immediately poured into 100 ml glass petri dishes and allowed to foam and cure. Temperatures were monitored using a strip-chart recorder with thermocouple probe centered in mixture.

| Example | a | b | c | d | e |
|---|---|---|---|---|---|
| 1-t-butylazo-1-hydroxy cyclohexane (g) | 1.0 | 0.75 | 0.5 | 0.25 | 0.0 |
| 2-t-butylazo-2-hydroxy butane (g) | 0.0 | 0.25 | 0.5 | 0.75 | 1.0 |
| Minutes to peak exotherm | 8.3 | 7.2 | 6.9 | 6.2 | 5.5 |
| Peak exotherm, (° F) | 177 | 173 | 166 | 158 | 154 |
| Foam Density, (lb/ft$^3$) | 43.5 | 41 | 35 | 33 | 31 |
| Density Decrease (Δ) lb/ft$^3$ |  | 2.5 | 6 | 3 | 2 |
| Shore hardness      top of foam | 120 | 115 | 110 | 95 | 92 |
| After 72 hours      bottom of foam | 120 | 115 | 113 | 105 | 100 |

(1) 80-135 Scale Durometer from Shore Instrument and Mfg. Co., Inc., conforms to SAE J200 and ASTM D2000.
(2) Lupol 40-7502, available from Freeman Chemical Co. This is an unsaturated polyester resin containing styrene monomer. It is prepared by reacting isophthalic acid, maleic anhydride, and propylene glycol to give a resin having an acid value of 30.
(3) Grade GHA-332, from Mineral Products Div., Great Lakes Foundry Sand Co., used to impart flame retardant properties.

Note that in the range of 25% to 50% "LUCEL 4" (or 75 to 50% "LUCEL 6") the decrease in density was greater than would be expected, showing an apparent synergism.

With regard to commercial utility, mistures containing about 50% weight of each azo appear very promising. That is, while the more acid sensitive compound (2-t-butylazo-2-hydroxy butane) provides the lowest foam density, it is more toxic, more volatile, less thermally stable (requiring storage at −18° C or lower) and has a higher flash point than does the other less acid-sensitive component. However, the 50–50 mixture is significantly improved in all of these properties (especially in flash point and thermal stability) while having sufficient acid sensitivity to be useful in most, if not all, of the foaming which has been described herein for the 2-t-butylazo-2-hydroxy butane.

EXAMPLE 2

Using Multiple Azo Compounds to Foam and Cure Polyesters 100 g. of Standard Polyester resin, 1.0 g. of Dow Corning 193 surfactant, 1.0 g. of 60% $H_2SO_4$, and 0.02 g. of 5% copper naphthenate in styrene were placed in 9-oz. waxed paper cups and blended using an electric mixer. The indicated quantities of foaming agents were then added and mixed at high speed for 20 seconds.

| Example | A | B | C |
|---|---|---|---|
| 1-t-Butylazo-1-acetoxycyclohexane (g.) | 2.0 | 0.0 | 1.0 |
| 2-t-Butylazo-2-methoxypropane (g.) | 0.0 | 2.0 | 1.0 |
| Resulting Density (lb./ft.$^3$) | 27.8 | 23.2 | 25.0 |

In general, the two azo compounds in this example are more stable at room temperature and are less acid-sensitive than the "hydroxy" azos used in Example 1. Accordingly, addition of a strong mineral acid (here $H_2SO_4$) is preferred in the process.

Dow Corning 193 surfactant is further defined in Example 22 of Ser. No. 548,946.

EXAMPLE 3

Using Mixtures of Azo Compounds with Appreciably Different Acid-Sensitivity

Crude 2-t-butylazo-2-butylperoxypropane was prepared by reacting 2-t-butylazo-2-chloropropane with an aqueous solution of the potassium salt of t-butyl hydroperoxide according to the method described in MacLeay, Lange and Sheppard application Ser. No. 426,411 filed Dec. 19, 1973, (which is incorporated herein by reference). The resultant product contained approximately 75% 2-t-butylazo -2-t-butylperoxypropane and 25% 2-t-butylazo-2-hydroxy-propane (which has been marketed as "LUCEL 3").

To 20 grams of the Standard Unsaturated Polyester Resin was added 0.2 grams of the above mixture, the resin was stirred well using a wood tongue depressor for about 15 seconds, and the resin poured into a 20 × 150 mm test tube to a depth of 3 inches. The internal temperature of the mixture was recorded as a function of time and a peak exotherm of 250° F (121° C) was reached in 5.5 minutes indicating an excellent cure of the resin had occurred. In addition, the resin had expanded to twice its original volume. The test tube was broken and the foam removed. The foam was very hard and did not crumble. Note that no "activator" (such as added acid) was used to produce foaming and curing using this mixture.

EXAMPLE 4

Foaming and Curing Polyesters using 2-t-butylazo-2-(t-butylperoxy)propane 95 g. of Standard Polyester resin, 5.0 g. of methacrylonitrile, 1.0 g. of Dow Corning 193 Surfactant, and 3.0 g. of acetyl sec-heptyl sulfonyl peroxide (50% in dimethylphthalate) were placed in a 9 oz. waxed paper cup and blended using an electric stirrer. 2.0 g. of 2-t-butylazo-2-(t-butyl)peroxy) propane (50% in hexane) was then added and mixed at high speed for 20 seconds. The mixture foamed and cured to a density of 20 lb/ft$^3$ in about 12 minutes.

EXAMPLE 5

Foaming and Curing an acrylic syrup using 2-t-butylazo-2-(t-butylperoxy) propane To 65 parts of methyl methacrylate (inhibited with 10 ppm of monomethylether of hydroquinone) stirring in a mixing bowl, 35 parts of Elvacite 2009 was added. The mixture was stirred until a clear syrup was obtained. 70 g. of the above syrup, 2.5 g. of trimethylolpropanetrimethacrylate, 1.0 g. of Dow Corning 193 Surfactant, 1.0 g. of dichloroacetic acid, 0.15 g. of 10% copper napthenate in dioctylphthalate and 30 g. of hydrated alumina were placed in a 9 oz. waxed paper cup and blended using an electric mixer. 2.0 g. of 2-t-butylazo-2-(t-butylperoxy) propane (50% in hexane) was then added and the mixing was continued at high speed for 20 seconds. The mixture foamed and cured to a density of 25.6 lb/ft$^3$ in about 5 minutes. Elvacite 2009 is further defined in Ser. No. 548,946 (Example 50).

EXAMPLE 6

Foaming and Curing Plyester using 2-t-butylazo-2-hydroperoxy-4-methyl pentane 95 g. of Standard Polyester resin, 5.0 g. of methacrylonitrile, 1.0 g. of Dow Corning 193 Surfactant, and 3.0 g. of acetyl sec-heptyl sulfonyl peroxide (50% in dimethyl phthalate) were placed in a 9 oz. waxed paper cup and blended using an electric stirrer. 2.0 g. of 2-t-butylazo-2-hydroperoxy-4-methylpentane (50% in mineral spirits) was then added and mixed at high speed for 20 seconds. The mixture foamed and cured to a density of 29 lb/ft$^3$ in about 25 minutes.

EXAMPLE 7

Foaming and Curing an acrylic syrup using 2-t-butylazo-2-hydroperoxy-4-methyl pentane To 65 parts of methyl methacrylate (inhibited with 10 ppm of monomethyl ether of hydroquinone) stirring in a mixing bowl, 35 parts of Elvacite 2009 was added. The mixture was stirred until a clear syrup was obtained. 70 g. of the above syrup, 3.0 g. of acetyl sec-heptyl sulfonyl peroxide (50% in dimethyl phthalate) 1.0 g. of Dow Corning 193 Surfactant, 0.5 g. of trimethylolpropanetrimethacrylate, and 30 g. of hydrated alumina were placed in a 9-oz. waxed paper cup and blended using an electric mixer. 2.0 g. of 2-t-butylazo-2-hydroperoxy-4-methyl pentane (50% in mineral spirits) was then added and the mixing was continued at high speed for 20 seconds. The mixture foamed and cured to a density of 16.5 lb/ft$^3$ in about 15 minutes.

When this example was tried using dichloroacetic acid instead of the acetyl sec-heptyl sulfonyl peroxide, no foaming occurred.

EXAMPLE 8

Foaming Polyester Resin using Combination of two acid-sensitive azo peroxy compounds 95 g. of Standard Polyester resin, 5.0 g. of methacrylonitrile, 1.0 g. of Dow Corning 193 Surfactant, and 3.0 g. of acetyl sec-heptyl sulfonyl peroxide (50% in dimethylphthalate) were placed in a 9-oz. waxed paper cup and blended using an electric stirrer. 1.0 g. of 2-t-butylazo-2-(t-butylperoxy) propane (50% in hexane), and 1.0 g. of 2-t-butylazo-2-hydroperoxy-4-methylpentane (50% in mineral spirits) were then added and mixed at high speed for 20 seconds. The mixture foamed and cured to a density of 24 lb/ft$^3$ in about 17 minutes.

EXAMPLE 9

Foaming of an acrylic syrup using combination of two acid-sensitive azo/peroxy compounds To 65 parts of methyl methacrylate (inhibited with 10 ppm of monomethylether of hydroquinone) stirring in a mixing bowl, 35 parts of Elvacite 2009 was added. The mixture was stirred until a clear syrup was obtained. 70 g. of the above syrup, 1.0 g of trimethylolpropanetrimethacrylate, 1.0 g. of Dow Corning 193 Surfactant, 3.0 g. of acetyl sec-heptylsulfonyl peroxide (50% in dimethyl phthalate) and 30 g. of hydrated alumina were placed in a 9-oz. waxed paper cup and blended using an electric mixer.

1.0 g. of 2-t-butylazo-2-(t-butylperoxy) propane (50% in hexane), and 1.0 g. of 2-t-butylazo-2-hydroperoxy-4-methyl pentane (50% in mineral spirits) were then added and the mixing was continued at high speed for 20 seconds. The mixture foamed and cured to a density of 16 lb/ft$^3$ in about 16 minutes.

EXAMPLE 10

Mixtures of phenyl, mono, di and tri chlorophenyl, alpha-aryl and alkyl thio-substituted azoalkanes Mixtures jof phenyl, mono, di and tri chlorophenyl, alpha-aryl and alkyl thio-substituted azoalkanes were prepared in accordance with the methods illustrated in Examples 4 and 5 of Ser. No. 548,946 and used as such to foam the Standard Unsaturated Polyester Resin.

Table I reports the specific azo mixtures, the foaming conditions and the density of the resulting foam. Without a foaming agent, the unsaturated polyester cured to a density of 1.25 g/cc.

EXAMPLE 11

Mixtures of isocyanato or isothiocyanato azo Derivatives to Foam and Cure Polyester

Mixtures of phenyl, chlorophenyl, dichlorophenyl and trichlorophenyl alpha-substituted azo alkanes, wherein the alpha substituents are derivatives of isocyanato and isothiocyanato functions were prepared in accordance with the methods illustrated in Examples 4, 5 and 6 of Ser. No. 548,946. The results of foaming and curing the Standard Unsaturated Polyester Resin with these mixtures is reported in Table II herein, wherein the derivatives are ureido, thioureido, carbamyl, and thiocarbamyl.

pound that gas is released in said medium and during said decomposition said mono- or poly-azo compound promotes polymerization and/or corss-linking of said medium to provide a matrix that is sufficiently polymerized and/or cross-linked that the generated gases cause the matrix to expand, each of the remaining valences being satisfied by an organic radical; provided that any carbon atom that is directly linked to an azo nitrogen, except that of a carbonyl group, has at least two of its remaining three valences satisfied by a carbon to carbon bond or a carbon to hydrogen bond.

2. The process of claim 1 wherein said effective amount comprises a mixture of phenyl and chlorophenyl alpha-aryl and alkyl thio-substituted azo alkanes or a mixture of phenyl and chlorophenyl alpha isocyanato azo or alpha isothiocyanato azo derivatives selected from ureido, thioureido, carbamyl, and thiocarbamyl.

TABLE I (EXAMPLE 10)

Use of mixtures of $R^5-N=N-\underset{Y}{\overset{R^6}{\underset{|}{C}}}-R^7$ to Foam and Cure Polyesters

| Run No. | SYNTHESIS DATA | | | | FOAMING DATA | | | |
|---|---|---|---|---|---|---|---|---|
| | $R^5$ | $R^6$ | $R^7$ | Y | Activator | Parts Activator | Parts Azo | Foam Density |
| 5-100 | $C_6H_{5-n}Cl_n$* | $CH_3$ | $CH_3$ | $-S-\phantom{x}\hspace{-2pt}\bigcirc\hspace{-2pt}-C(CH_3)_3$ | ACSP | 2.0 | 2.0 | 0.87 |
| 5-101 | $C_6H_{5-n}Cl_n$* | $CH_3$ | $CH_3$ | $-S-CH_2-CH_2-OH$ | ACSP | 2.0 | 2.0 | 0.82 |
| 5-102 | $C_6H_{5-n}Cl_n$* | $CH_3$ | i-Bu | $-S-\phantom{x}\hspace{-2pt}\bigcirc\hspace{-2pt}-C(CH_3)_3$ | $AH_6SP$ | 2.0 | 2.0 | 0.81 |

*n is 0, 1, 2 and 3 in these mixtures

TABLE II
(Example 11)
USE OF MIXTURES OF UNSYMMETRICAL α-ISOCYANATO AZO AND α-ISOTHIOCYANATO AZO DERIVATIVES TO PREPARE POLYESTER FOAMS (Y = $-NH-\overset{\overset{X}{\|}}{C}-Q$)

| RUN NO. | SYNTHESIS DATA | | | | | FOAMING DATA | | |
|---|---|---|---|---|---|---|---|---|
| | $R^5$ | $R^6$ | $R^7$ | X | Q | Activator | Parts Activator | Parts Azo | Foam Density |
| 6-20 | $C_6H_{5-n}Cl_n$* | $CH_3$ | $CH_3$ | S | $-NH$-t-Bu | none | — | 2.0 | 0.84 |
| 6-21 | $C_6H_{5-n}Cl_n$* | $-(CH_2)_5-$ | | S | $-OCH_3$ | none | — | 2.0 | 1.00 |
| 6-41 | $C_6H_{5-n}Cl_n$* | $CH_3$ | $CH_3$ | O | $-NH$-t-Bu | $AH_6SP$ | 2.0 | 2.0 | 0.72 |
| 6-42 | $C_6H_{5-n}Cl_n$* | $CH_3$ | i-Bu | O | $-NH$-t-Bu | none | — | 2.0 | 0.90 |
| 6-43 | $C_6H_{5-n}Cl_n$* | $-(CH_2)_5-$ | | O | $-OCH_3$ | $AH_6SP$ | 2.0 | 2.0 | 0.69 |

*n is 0, 1, 2 and 3

We claim:

1. A process for preparing cellular polymeric structures which comprises mixing an acidulous or acidic polymerizable medium that is polymerizable and/or cross-linkable by a free radical mechanism with an effective amount of two or more acid sensitive mono- or poly-azo compounds containing the group:

FORMULA I $$-N=N-\underset{Y}{\overset{|}{\underset{|}{C}}}-$$

wherein in Y is an acid sensitive group which in the presence of an acidulous or acidic polymerizable medium causes sufficient decompositon of the azo com- 3. The process of claim 1 wherein said effective amount comprises a mixture of 2-t-butylazo-2-t-butylperoxypropane and 2-t-butylazo-2-hydroxypropane.

4. The process of claim 3 wherein said mixture contains about 75 weight% 2-t-butylazo-2-t-butylperoxypropane.

5. The process of claim 1 wherein the relative rate of decomposition in said medium between two said azo compounds is at least about as great as that between 2-t-butylazo-2-t-butylperoxypropane and 2-t-butylazo-2-hydroxypropane.

6. The process of claim 1 wherein Y in one said azo compound is a hydroxy group and in another said compound Y is a peroxy group.

7. The process of claim 6 wherein the remaining substituents in said Formual I of the said azo compounds containing hydroxy and peroxy groups are all hydrocarbyl.

8. The process of claim 7 wherein at least one said hydrocarbyl group is t-butyl.

9. The process of claim 8 wherein the relative weight proportion of said azo compound containing the peroxy group to said azo compound containing the hydroxy group is about 3/1.

10. The process of claim 1 wherein Y in one said azo compound is a hydroxy group.

11. The process of claim 1 wherein at least one said azo compound is a peroxy compound.

12. The process of claim 11 wherein said peroxy compound is of the form R″OO—, where R″ is tertiary alkyl containing 4 to 18 carbon atoms, or tertiary aralkyl containing 9 to 18 carbon atoms.

13. The process of claim 1 wherein Y in at least two said azo compounds is different.

14. The process of claim 1 wherein Y in at least two said azo compounds is the same.

15. The process of claim 1 wherein Y is OH,

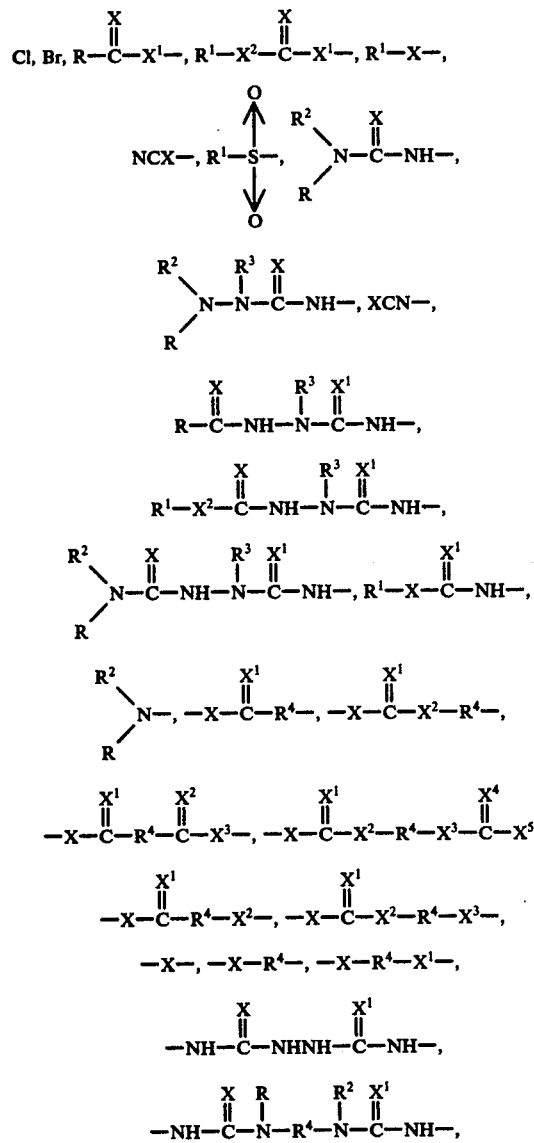

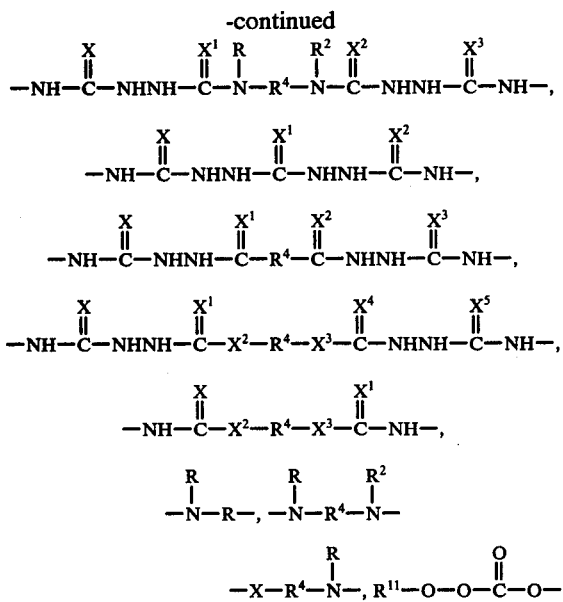

each of R, $R^2$ and $R^3$ is the same or different substituent including H, a hydrocarbon radical containing 1 to 18 carbon atoms, such as: alkyl, cycloalkyl, aralkyl, arcycloalkyl, aryl, alkaryl, cycloalkaryl, alkenyl, cycloalkenyl, and 5 and 6 membered heterocyclic and benzheterocyclic radical wherein the hetero atoms are selected from oxygen, sulfur and nitrogen, and R and $R^2$ together may form an alkylene diradical, said hydrocarbon radicals being optionally substituted by a group containing 1 to 18 carbon atoms selected from alkoxy, aryloxy, aroyloxy, alkanoyloxy, alkoxycarbonyl, alkanoyl, aroyl, and carbamoyl, hydroxy, halogen, and cyano; when Y is other than OH, R, $R^2$ and/or $R^3$ may also be substituted by carboxyl;

$R^1$ is a substituted or nonsubstituted hydrocarbon radical containing 1 to 18 carbon atoms such as alkyl, cycloalkyl, aralkyl, arcycloalkyl, aryl, alkaryl, or cycloalkaryl, said hydrocarbon radical being optionally substituted by a group containing 1 to 18 carbon atoms selected from t-alkylperoxy-, t-aralkylperoxy, t-cycloalkylperoxy, t-alkylperoxycarbonyl, t-alkylperoxycarbonyloxy, alkanoylperoxy, alkanoylperoxycarbonyl, α-hydroxyalkylperoxy-α-hydroxyalkyl, α-hydroperoxyalkylperoxy-α-hydroxyalkyl, alkanoylperoxycarbonyloxy, di-(t-alkylperoxy)-methylene, alkenyl, cycloalkenyl, alkynyl, cycloalkynyl, alkoxy, cycloalkoxy, aryloxy, alkaryloxy, cycloalkaryloxy, aroyloxy, alkaroyloxy, carbamoyloxy, alkanoyloxy, alkoxycarbonyloxy, cycloalkoxycarbonyloxy, alkaryloxycarbonyloxy, aryloxycarbonyloxy, alkoxycarbonyl, cycloalkoxycarbonyl, aryloxycarbonyl, alkaryloxycarbonyl, alkoxycarbonylamino, cycloalkoxycarbonylamino, aryloxycarbonylamino, alkaryloxycarbonylamino, alkanoyl, aroyl, alkaroyl, carbamoyl, acylamino, aroylamino, alkylamino, arylamino, thioalkanoyl, dithioalkanoyl, thioaroyl, dithioaroyl, alkylthio, arylthio and 5 and 6 membered heterocyclic and benzheterocyclic wherein the hetero atoms are selected from oxygen, sulfur and nitrogen; as well as amino, hydroxy, halogen and cyano;

R[4] is a substituted or non-substituted divalent hydrocarbon radical of 1 to 20 carbon atoms, such as alkylene, cycloalkylene arylene, aralkylene, or cycloalkylalkylene, such divalent radicals optionally containing one or two non-terminal and non-adjacent hetero atoms selected from oxygen, nitrogen, and sulfur in the chain, the substituents borne by R[4] being any of those defined herein for R[1].

16. The process of claim 15 wherein one azo compound has the formula:

FORMULA II

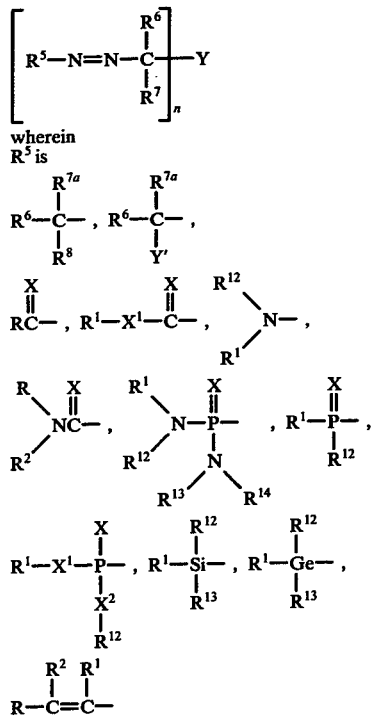

wherein R[5] is or one of the substituted or nonsubstituted hydrocarbon radicals defined herein for R[1], provided that any substituent borne by R[5] is not linked to the R[5] carbon atom directly attached to an azo nitrogen of FORMULA II; R[12], R[13] and R[14] are same or different radicals as defined for R[1]:

R[6] is

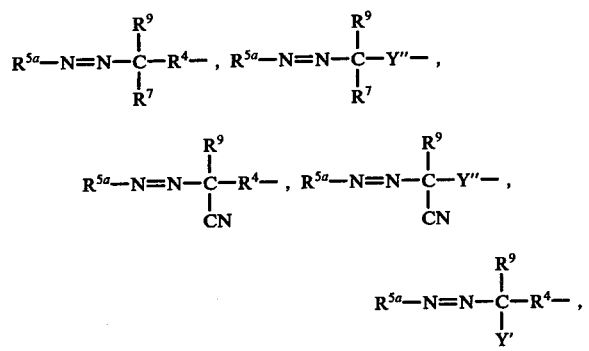

or one of the substituted or nonsubstituted hydrocarbon radicals defined for R[1];

R[7] is a substituted or nonsubstituted hydrocarbon radicals containing 1 to 18 carbon atoms, such as alkyl, cycloalkyl, aralkyl, and arcycloalkyl wheein the substituent borne by R[7] is selected from the substituents defined in claim 14 for R[1];

R[7] can be hydrogen when Y is —OH or R—C(=O)O;

R[6] and R[7] may together form a ring with the carbon linked to the azo nitrogen;

R[7a] is the same as R[7] except it is not H;

R[8] is

R[9] is the same as R[6] except it is not any of the azo radicals defined therefor;

R[10] is lower alkyl (1 to 6 carbon atoms) or cycloalkyl (5 to 6 carbon atoms);

Y is defined hereinbefore plus

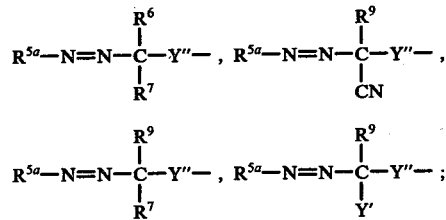

Y' is a monovalent group that is the same as Y except Y' is not

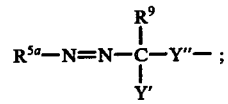

Y'' is the same as Y when Y is divalent;

Y'' and R[7] taken together with the carbon to the azo nitrogen form a ring containing 4 to 12 atoms;

R[5a] is the same as R[5] except that where R[5] is

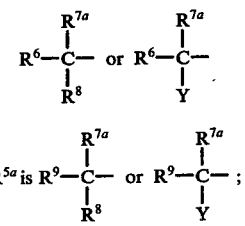

$n$ is 1 or 2.

17. The process of claim 16 wherein Y is —OH in Formula II.

18. The process of claim 17 wherein said azo compound is 2-t-butylazo-2-hydroxypropane.

19. The process of claim 17 wherein said azo compound is 2-t-butylazo-2-hydroxybutane.

20. The process of claim 17 wherein said azo compound is 1-t-butylazo-1-hydroxycyclohexane.

21. Cellular structures prepared in accordance with the process of claim 1.

22. The cellular structures of claim 21 further characterized in that said structures are essentially in the form of open cells.

23. The cellular structures of claim 21 further characterized in that said structures are essentially in the form of closed cells.

* * * * *

UNITED STATES PATENT OFFICE
CERTIFICATE OF CORRECTION

Patent No. 4,101,464             Dated July 18, 1978

Inventor(s) E. R. Kamens, D. M. Kressin, H. C. Lange, R. E. MacLeay

It is certified that error appears in the above-identified patent and that said Letters Patent are hereby corrected as shown below:

On line 3, column 32, it reads:

"promotes polymerization and/or corss-linking of said"

It should read:

--promotes polymerization and/or cross-linking of said--

On line 20, column 34, it reads:

$$"\begin{array}{c} R \\ | \\ -N-R- \end{array}, "$$

It should read:

$$--\begin{array}{c} R \\ | \\ -N-R^4- \end{array}, --$$

UNITED STATES PATENT OFFICE
CERTIFICATE OF CORRECTION

Patent No. 4,101,464  Dated July 18, 1978

Inventor(s) E. R. Kamens, D. M. Kressin, H. C. Lange, R. E. MacLeay

It is certified that error appears in the above-identified patent and that said Letters Patent are hereby corrected as shown below:

On line 68, column 35, it reads:

"aikyl, cycloalkyl, aralkyl, and arcycloalkyl wheein"

It should read:

--alkyl, cycloalkyl, aralkyl, and arcycloalkyl wherein--

Signed and Sealed this

Fifth Day of June 1979

[SEAL]

Attest:

RUTH C. MASON
Attesting Officer

DONALD W. BANNER
Commissioner of Patents and Trademarks